US011664678B2

(12) United States Patent
Martinez et al.

(10) Patent No.: US 11,664,678 B2
(45) Date of Patent: *May 30, 2023

(54) GRID ASSET MANAGER

(71) Applicant: Heila Technologies, Inc., Somerville, MA (US)

(72) Inventors: Jorge Elizondo Martinez, Sonoma, CA (US); Albert Tak Chun Chan, Castro Valley, CA (US); Jose Jamil Dunia Dahdah, Gainesville, FL (US); Francisco A. Morocz Bazzani, Somerville, MA (US)

(73) Assignee: Heila Technologies, Inc., Somerville, MA (US)

( * ) Notice: Subject to any disclaimer, the term of this patent is extended or adjusted under 35 U.S.C. 154(b) by 303 days.

This patent is subject to a terminal disclaimer.

(21) Appl. No.: 17/155,382

(22) Filed: Jan. 22, 2021

(65) Prior Publication Data

US 2021/0175709 A1    Jun. 10, 2021

Related U.S. Application Data

(63) Continuation of application No. 16/054,377, filed on Aug. 3, 2018, now Pat. No. 10,903,650.

(Continued)

(51) Int. Cl.
*H02J 3/14* (2006.01)
*H02J 13/00* (2006.01)
(Continued)

(52) U.S. Cl.
CPC ........ *H02J 13/00004* (2020.01); *G06Q 10/04* (2013.01); *H02J 3/00* (2013.01);
(Continued)

(58) Field of Classification Search
CPC . G06Q 10/04; G06Q 50/06; H02J 3/00; H02J 3/14; H02J 2203/20; H02J 2310/64
(Continued)

(56) References Cited

U.S. PATENT DOCUMENTS 7,167,817 B2   1/2007  Mosterman et al.
9,063,525 B2   6/2015  Sanders et al.
(Continued)

FOREIGN PATENT DOCUMENTS

CN    107679776 A    2/2018
CN    108306292 A    7/2018
(Continued)

OTHER PUBLICATIONS

Hledik, Ryan and Lazar, Jim, "Distribution System Pricing With Distributed Energy Resources", May 2016, Future Electric Utility Regulation, Report No. 4, 94 pages (Year: 2016).*

(Continued)

*Primary Examiner* — Omar Zeroual
*Assistant Examiner* — Freda A Nelson
(74) *Attorney, Agent, or Firm* — Nutter McClennen & Fish LLP

(57) ABSTRACT

An asset manager controls power distribution within an aggregated distributed energy resources system ("DERs system") having a plurality of assets. The asset manager is configured to operate with a given asset. As such, the asset manager has 1) an interface to receive asset information relating to the given asset and to communicate with another asset manager in the DERs system, and 2) a function generator configured to produce a local cost function using data relating to the given asset only. The local cost function represents a portion of a system cost function for the DERs system. The asset manager also has 3) a controller configured to use the local cost function for the given asset to (Continued)

manage operation of the given asset in the DERs system. In addition, the controller also is configured to determine, using the local cost function, an operating point for the given asset.

20 Claims, 14 Drawing Sheets

Related U.S. Application Data

(60) Provisional application No. 62/540,974, filed on Aug. 3, 2017.

(51) Int. Cl.
*H02J 3/00* (2006.01)
*G06Q 10/04* (2023.01)
*H02J 3/46* (2006.01)
*G06Q 50/06* (2012.01)

(52) U.S. Cl.
CPC .............. *H02J 3/001* (2020.01); *H02J 3/14* (2013.01); *H02J 3/46* (2013.01); *H02J 13/00002* (2020.01); *G06Q 50/06* (2013.01); *H02J 2203/20* (2020.01); *H02J 2310/64* (2020.01)

(58) Field of Classification Search
USPC .......................... 705/7.35; 700/286, 291, 292
See application file for complete search history.

(56) References Cited

U.S. PATENT DOCUMENTS

| | | | |
|---|---|---|---|
| 9,300,137 B2 | 3/2016 | Cherian et al. | |
| 9,417,276 B1 | 8/2016 | Tatcho et al. | |
| 9,500,717 B1 | 11/2016 | Salmani et al. | |
| 9,762,060 B2 | 9/2017 | Kalsi et al. | |
| 9,886,014 B2 | 2/2018 | Yoo et al. | |
| 10,061,283 B2 | 8/2018 | Wong et al. | |
| 10,892,638 B2 | 1/2021 | Martinez et al. | |
| 10,903,650 B2 | 1/2021 | Martinez et al. | |
| 2006/0047369 A1* | 3/2006 | Brewster ........... | H02J 13/00002 700/286 |
| 2007/0124026 A1 | 5/2007 | Troxell et al. | |
| 2008/0168092 A1 | 7/2008 | Boggs et al. | |
| 2009/0157835 A1 | 6/2009 | Thompson et al. | |
| 2010/0207456 A1 | 8/2010 | Lasseter et al. | |
| 2011/0035073 A1 | 2/2011 | Ozog | |
| 2011/0093127 A1* | 4/2011 | Kaplan .................. | G06Q 10/06 700/297 |
| 2012/0005505 A1 | 1/2012 | Tolia et al. | |
| 2012/0239215 A1 | 9/2012 | Timbus et al. | |
| 2012/0271470 A1 | 10/2012 | Flynn et al. | |
| 2013/0166084 A1 | 6/2013 | Sedighy et al. | |
| 2013/0226360 A1 | 8/2013 | Wilkins et al. | |
| 2013/0338843 A1 | 12/2013 | Iravani et al. | |
| 2014/0306533 A1 | 10/2014 | Paquin et al. | |
| 2015/0067356 A1 | 3/2015 | Trichy Ravi et al. | |
| 2015/0134130 A1 | 5/2015 | Carralero et al. | |
| 2015/0277406 A1 | 10/2015 | Maturana et al. | |
| 2016/0109895 A1 | 4/2016 | Schindler | |
| 2016/0117657 A1 | 4/2016 | Forbes, Jr. et al. | |
| 2016/0180474 A1* | 6/2016 | Steven ................. | G06Q 50/06 705/7.24 |
| 2016/0190805 A1 | 6/2016 | Steven et al. | |
| 2016/0197476 A1 | 7/2016 | Stewart | |
| 2016/0363948 A1 | 12/2016 | Steven et al. | |
| 2017/0103468 A1 | 4/2017 | Orsini et al. | |
| 2017/0243305 A1 | 8/2017 | Yoo et al. | |
| 2018/0088616 A1* | 3/2018 | Aggarwal .............. | G06Q 50/06 |
| 2018/0115160 A1 | 4/2018 | Tuladhar et al. | |
| 2018/0262010 A1 | 9/2018 | Kato et al. | |
| 2018/0366978 A1 | 12/2018 | Matan et al. | |
| 2019/0033801 A1 | 1/2019 | Baone et al. | |
| 2019/0036339 A1 | 1/2019 | Wong et al. | |
| 2019/0044333 A1 | 2/2019 | Martinez et al. | |
| 2019/0044378 A1 | 2/2019 | Martinez et al. | |
| 2019/0109895 A1 | 4/2019 | Power et al. | |
| 2019/0158314 A1 | 5/2019 | Choi et al. | |
| 2019/0173286 A1 | 6/2019 | Ilic et al. | |
| 2019/0195526 A1 | 6/2019 | Drees et al. | |
| 2020/0083713 A1 | 3/2020 | Dall'Anese et al. | |
| 2020/0153246 A1 | 5/2020 | Martinez | |
| 2020/0175617 A1 | 6/2020 | Martinez | |

FOREIGN PATENT DOCUMENTS

| | | | |
|---|---|---|---|
| EP | 3002848 A1 | 4/2016 | |
| KR | 1020150117085 A | 10/2015 | |
| KR | 1020170028699 A | 3/2017 | |
| WO | 2016200398 A1 | 12/2016 | |
| WO | WO-2016200398 A1 * | 12/2016 | ........... G05B 13/021 |
| WO | 2019141511 A1 | 7/2019 | |

OTHER PUBLICATIONS

International Searching Authority—International Search Report for Application No. PCT/US2018/045176, together with the Written Opinion, dated Oct. 16, 2018, 13 pages.
International Searching Authority—International Search Report and Written Opinion for International Patent Application PCT/US2018/045275, dated Oct. 19, 2018, 19 pages.
International Searching Authority—International Search Report and Written Opinion for International Patent Application PCT/US2018/064332, dated Feb. 19, 2020, 15 pages.
International Searching Authority—International Search Report and Written Opinion for International Patent Application No. PCT/US2019/061321, dated Mar. 10, 2020 (16 pages).
Extended European Search Report for European Patent Application No. 18842360.2, dated Dec. 22, 2020 (6 pages).
Ruggeri—"Centralised and decentralised control of active distribution systems: models, algorithms and applications", 2014 [retrieved on Jan. 29, 2020]. Retrieved from the internet, 86 pages https://pdfs.semanticscholar.org/d898/fec6fae3729b603b74c0d24576bd53ebc784.pdf? entire document, 150 pages.
Ryan Hledik and Jim Lazar, "Distribution System Pricing With Distributed Energy Resources", May 2016, Future Electric Utility Regulation, Report No. 4, 94 pages. (Year: 2016).
Wang et al.—"Frequency-adaptive grid-virtual-flux synchronization by multiple second-order generalized integrators under distorted grid conditions", Turkish Journal of Electrical Engineering and Computer Sciences, Jul. 9, 2015, vol. 23, Issue 6, pp. 1930-1945, [retrieved on Jan. 29, 2020]. Retrieved from the internet, http://journals.tubitak.gov.tr/elektrik/issues/elk-15-23-6/elk-23-6-29-1404-265.pdf entire document.

* cited by examiner

The cost function at time "i" depends on the expected value of the following at that time:

- Real and reactive power $(P_i, Q_i)$
- States and variables $(x_i)$
- The price signal $(p_i)$
- External variables $(\Theta_i)$ Option 1

Option 2

GRID ASSET MANAGER

CROSS-REFERENCE TO RELATED APPLICATIONS

This application is a continuation of U.S. patent application Ser. No. 16/054,377, entitled "GRID ASSET MANAGER," filed Aug. 3, 2018, which claims priority from U.S. provisional patent application No. 62/540,974, filed Aug. 3, 2017, entitled, "DISTRIBUTED OPTIMIZATION FOR MICROGRIDS," each of which is incorporated herein, in its entirety, by reference.

FIELD OF THE INVENTION

Illustrative embodiments of the invention generally relate to power distribution networks and, more particularly, illustrative embodiments of the invention relate to devices for managing power distribution across a power network.

BACKGROUND OF THE INVENTION

The electric grid connects homes, buildings, and a wide variety of devices/systems to centralized power sources. This interconnectedness typically involves centralized control and planning, which, undesirably, can cause grid vulnerabilities to rapidly cascade across the network. To mitigate these risks, those in the art have formed "aggregated distributed energy resources systems" (referred to herein for simplicity as "DERs systems"). By way of example, a "microgrid" is one such implementation of a DERs system. Specifically, among other qualities, microgrids often include controlled clusters of electric generation devices and loads that provide a coordinated response to a utility need. A microgrid also can operate in a state in which it is connected to the main grid or disconnected from the main grid. These features, among other things, improve DER efficiency, resiliency, and reliability.

The US Department of Energy formally defines a microgrid as a group of interconnected loads and distributed energy resources ("DERs") with clearly defined electrical boundaries. When used together, this group acts as a single controllable entity with respect to the main grid. To those ends, a microgrid often has distributed electric generators (e.g., diesel generators and gas turbines, etc.), batteries for power storage, and renewable power resources, such as solar panels, hydroelectric structure, and wind turbines.

SUMMARY OF VARIOUS EMBODIMENTS

In accordance with one embodiment of the invention, an asset manager is configured to control distribution of power within an aggregated distributed energy system ("DERs system") having a plurality of assets. To that end, the asset manager is configured to operate with a given asset in the DERs system. As such, the asset manager has 1) an interface configured to receive asset information relating to the given asset and to communicate with at least one other asset manager (or other device, such as a central controller) in the DERs system, and 2) a function generator operatively coupled with the interface. The function generator is configured to produce a local cost function using data related to the given asset only (e.g., environmental temperature local to the given asset, power requirements, etc.). The local cost function represents a portion of a system cost function for the overall DERs system. The asset manager also has 3) a controller operatively coupled with the function generator. The controller is configured to determine, using the local cost function, an operating point for the given asset, and use the determined operating point for the given asset to manage operation of the given asset in the DERs system.

The interface may be configured to receive one or more cost functions from other asset managers. As such, the controller may forward control signals to the other asset managers to manage distribution of energy of the DERs system as a function of the local cost function and the received one or more cost functions.

The local cost function can be formed with a plurality of different variables. For example, the local cost function may include at least a portion relating to opportunity cost. To refine processes, the opportunity cost may include tunable parameters that the controller is configured to modify to improve revenue of the given asset. The local cost function also may include at least a portion relating to response limitations of the given asset relative to a function of the given asset. To that end, in response to receipt of commands to the given asset, the controller may be configured to produce a given response with response data relating to the given asset. Accordingly, the controller may be configured to measure the response data and calculate one or more response limitations of the given asset using the measured response data.

Moreover, the local cost function may be inversely proportional to the asset efficiency at a given operating point and/or the given asset's power rating. In some embodiments, the local cost function includes expected future conditions relating to the given asset.

The controller further may be configured to receive operating data from the given asset, and then use the operating data to determine the long-term effects on the given asset and/or the given asset's response time and/or efficiency. In that case, the function generator may use the long-term effects on the given asset, and/or the given asset response time and/or the given asset efficiency to produce the local cost function of the given asset.

In accordance with another embodiment of the invention, a method of distributing power from an aggregated distributed energy resources system ("DERs system") having a plurality of assets uses a plurality of asset managers to manage the assets. Each asset includes a local dedicated asset manager separate from the other asset managers, and each asset manager has an interface to receive asset information relating to its asset. For each asset, the method produces a local cost function using its local dedicated asset manager. Each local dedicated asset manager produces its local cost function using data relating to its local asset only. The cost functions of the plurality of assets in the DERs system together represent a grid cost function for the overall DERs system. The method determines, using the local cost function, an operating point for the given asset, and uses the determined operating point for the given asset to manage operation of the given asset in the DERs system.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, an aggregated distributed energy resources system ("DERs system" as noted above), such as a microgrid, a group of microgrids, and/or a larger grid, distributes intelligence between some or all of its assets to more efficiently manage power generation, use, and/or distribution. To that end, a DERs system configured in this manner may operate using a system-level cost function that is managed at the asset level. Specifically, each asset has an independent cost function that it and/or an asset manager (discussed below) maintains. Among other ways, some embodiments may implement such a system with a central controller in a manner that dynamically and more efficiently updates the system-level cost function. Accordingly, the day-to-day operation of the DERs system typically should be more efficient and responsive than known prior art techniques, while at the same time being less cumbersome to manage. Details of illustrative embodiments are discussed below.

Figure 1:
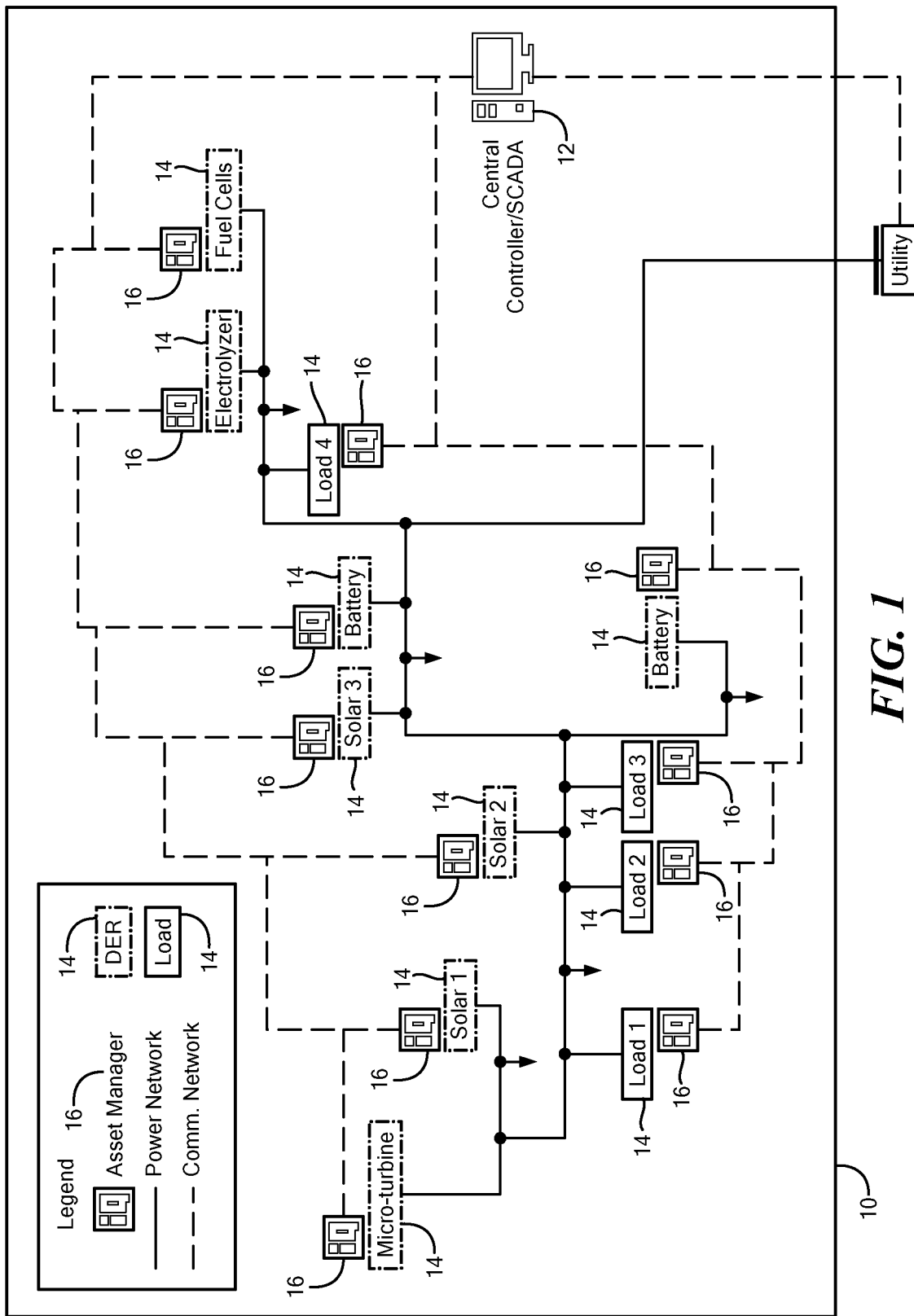
FIG. 1 schematically shows a power grid that may be implemented in accordance with illustrative embodiments of the invention.

FIG. 1 schematically shows an exemplary DERs system implemented in accordance with illustrative embodiments of the invention. The DERs system includes an electrical power network that interconnects the loads and DERs, including cables, transformers, switches, etc. Furthermore, the DERs system may include a grid connection. Among other ways, this DERs system may be implemented as a microgrid that connects with a larger grid ("Utility" in FIG. 1) through a central controller 12/SCADA device 12; i.e., a supervisory control and data acquisition device. For simplicity, this description discusses various microgrid embodiments, although those skilled in the art should understand that various embodiments apply to other grid structures beyond microgrids. Accordingly, discussion of a microgrid is by example only and thus, not intended to limit various DERs system embodiments.

Generically, the microgrid of FIG. 1 is a grid entity capable of generating, storing, and/or distributing electrical energy and thus, also is identified by reference number 10. The microgrid 10 of FIG. 1 may supply energy for a specific purpose, such as to a prescribed business (e.g., a power-hungry data center), a neighborhood, or for distribution to remote consumers via a larger power grid.

As known by those in the art and defined by the US Department of Energy, a microgrid may be a group of interconnected loads and distributed energy resources within clearly defined electrical boundaries that acts as a single controllable entity with respect to the larger grid. In a microgrid implementation of a DERs system, a microgrid can connect and disconnect from the larger grid to enable it to operate in both grid-connected or island-mode.

Accordingly, the microgrid 10 of FIG. 1 has a plurality of assets 14 connected by conventional interconnect techniques, such as with cables and other peripheral equipment (e.g., transformers). As also known by those in the art, an asset 14 can be a load or a distributed energy resource. Specifically, a device that transforms electricity into different types of energy may be considered a load. Exemplary loads often found in microgrids may include motors, pumps, HVACs, and illumination systems. Conversely, storage (e.g., batteries, flywheels, etc.) and generation devices (e.g., solar panels, wind turbines, diesel generators, gas turbine generators, etc.) may be considered distributed energy resources. FIG. 1 schematically shows several of these different types of assets 14.

As noted above, however, the DERs system of FIG. 1 may be configured to have many of the functions of a microgrid, but not meet the precise definition of the US Department of Energy. For example, the DERs system of FIG. 1 may operate in a manner that does not necessarily operate as in island mode, while also having many corresponding functions to those of a microgrid. For example, the DERs system may include a feeder in a distribution network that has dozens or hundreds of assets 14.

In accordance with illustrative embodiments, each asset 14 in the microgrid 10 of FIG. 1 has a dedicated asset manager 16 to manage and control at least portions of its operation within the network. Assets 14 having asset managers 16 thus may be referred to as "controllable assets 14." As such, the asset managers 16 effectively may be considered to form a distributed intelligent network that can be controlled and used by the central controller 12.

The asset managers 16 of FIG. 1 are co-located with and connected to assets 14, and can perform one or more of the following functions:

1) control the asset's output, such as its real and reactive power output, and/or output voltage and frequency;

2) measure qualities of the asset 14 and the system (e.g., at the point where the asset 14 connects with the system), such as the asset's terminal voltage and frequency, operating parameters, and other variables related to the asset 14 itself and/or the environment; and 3) communicate with other assets 14 or devices through a variety of known methods.

In preferred embodiments, the asset managers 16 enable a plug-and-play solution for simple, modular deployment. As such, the asset managers 16 may automatically reconfigure operation as assets 14 are added, removed, or modified from the microgrid 10. Moreover, the asset managers 16 also may have self-learning intelligence using machine learning and artificial intelligence technology, enabling the microgrid 10 to attain and preferably maintain optimal, close to optimal, or otherwise enhanced performance. When implemented with an open framework, third party software developers can add specially tailored software to the asset manager functionality to customize operation for specific customer needs.

It should be noted that although FIG. 1 shows all assets 14 as having an asset manager 16, some embodiments deploy the asset managers 16 for fewer than all assets 14. Other embodiments deploy single asset managers 16 or groups of asset managers 16 to be shared among two of more sets of assets 14. Accordingly, discussion of each asset 14 having a dedicated asset manager 16 is for convenience and not intended to limit various embodiments. Furthermore, some asset managers 16 may be physically located in close proximity to its asset(s) 14 (e.g., physically adjacent to the asset 14). Other embodiments, however, may couple an asset manager 16 remotely from its asset. For example, some embodiments may use a cloud model and implement the asset manager 16 functionality on a device remote from the asset 14 it manages. The asset 14 therefore may be located in Massachusetts, while the asset manager 16 may be deployed in California or China.

Those skilled in the art may deploy the asset manager 16 in a distributed manner local to the asset 14, remote from the asset 14, or both local/and remote to/from the asset. For example, the asset manager 16 may be implemented using a plurality of different, spaced apart modules around the asset 14 itself. As another example, the asset manager 16 may be implemented using a local set of one or more module(s) and a remote set of one or more module(s). Accordingly, the form factor and location of the asset manager 16 as being a single unit in a single housing physically adjacent to its asset 14 is for illustrative purposes only and not intended to limit various embodiments of the invention.

The overall microgrid 10 has a system cost function (discussed below) used to control its operation based on a variety of factors (also discussed below). Specifically, microgrids are complex systems that require "dispatch logic" (i.e., a way to control the amount of power each asset 14 may consume or produce at any given time). Such dispatch logic may be configured to achieve a variety of potentially overlapping and/or conflicting goals, which may include one or more of (a) minimizing operating and fuel costs, (b) reducing carbon emissions, and (c) prolonging equipment lifetime, etc.

Prior art technologies known to the inventors use one of two main ways in to produce this dispatch logic:

Rules-Based Expert System: With this approach, system experts heuristically create the dispatch logic. These rules might include, for example, to charge batteries during the day when there is solar energy available, to start diesel generators when the batteries are low, or to export/import energy to a battery according to a specific market price. Though directionally correct, this approach undesirably often requires customization to each specific system and can lead to underperforming systems, especially because many edge cases are not properly managed.

Centralized optimization: With this approach, a central controller executes an optimization algorithm. To do so, the central controller 1) collects information from the devices in the microgrid to create appropriate models, 2) sets up a variety of constraints, 3) solves the overall system optimization function, and then 4) obtains the dispatch logic from it.

While this latter approach can result in higher performing microgrids than for the prior noted rules based expert systems, it has several drawbacks. First, this approach still requires a degree of customization (e.g., adding or removing agents changes the optimization function and its constraints). Second, the communication network has real-world limitations on how much data can be transferred (and analyzed) in real time. For example, battery assets 14 typically send numerous unique outputs, including real and reactive power, state of charge, temperature, voltages, etc. Meanwhile, gas turbines with CHP (combined heat and power) generally transmit their own set of outputs, real and reactive power, efficiency, water flow, water temperature, etc. The quantity and diversity of output variables can dramatically slow down the optimization algorithms, making them incapable of reaching optimized solutions rapid enough for microgrid operations.

These solutions therefore highlight technical difficulties encountered in attempting to solve a difficult technical problem—efficiently managing assets 14 in the microgrid 10 to operate in a rapid, scalable, efficient, and effective manner. At a generic level, the inventors solved these technical problems by pushing cost functions to the asset managers 16. Specifically, each asset manager 16, which has control and a virtual and/or hard local connect to its asset 14, produces, maintains, and executes a local, customized cost function for the asset 14 it manages.

To those ends, each asset 14 includes a local cost function. In general, as known by those in the art, a cost function quantifies losses in a system and enables an asset 14 to operate at a specified operating point. To that end, a system cost function is a mathematical function constructed with variables from grid assets 14 (in some cases, the system as well) in such a way that obtains an operating point by minimizing or otherwise processing it. Preferably, this operating point is a peak efficiency, optimal, or desired operating point for a given system. Indeed, in illustrative embodiments, each asset manager 16 only has to manage the variables of the particular asset 14 to which it is connected. However, by aggregating the asset managers 16 in the microgrid 10, as well as their corresponding local cost functions, the system cost function can account for all assets 14.

In preferred embodiments, the cost function relates asset variables together to achieve an operating point in which multiple objectives are achieved at the same time. These objectives may be on an asset 14 by asset 14 basis, or on a grid-wide basis. Depending on the system requirements, the cost functions of some or all the assets 14 may be used to form a grid-level cost function. Among others, those objectives may include:

(1) Power Rating: Assets 14 respond according to their power capacity (i.e., larger assets 14 provide more power with everything else being equal). This ensures larger assets take a larger part of the load (2) Long Term Effects: Each asset manager 16 uses real data to consider the long-term effects on its own asset of any action when deciding how to operate.

(3) Efficiency: Asset losses are minimized by taking into account the asset's efficiency.

(4) Opportunity Cost: Assets 14 account for expected conditions in the future to adjust its present behavior by tuning some parameters specific to maximize a local profit function.

(5) Response Limitations: Each asset manager 16 considers its asset's own output response limitations when deciding how to operate so that the resulting planned output power is feasible.

Accordingly, in preferred embodiments, the local cost functions are formed with information relating to one or more of objectives 1-5 above. For example, some embodiments may include objectives 1-3, 2-5, 3-4, 1-2, and 4, 1 and 3-4, or other combination of 2 or more objectives.

Accordingly, in preferred embodiments, the local cost functions are formed with information relating to one or more of objectives 1-4 above. For example, some embodiments may include objectives 1-3, 2-4, 3-4, 1,-2, and 4, 1 and 3-4, or other combination of 2 or more objectives. The operating point that results from accounting for all of these objectives is referred to herein as the "optimal" operating point. As suggested above, other embodiments may not tune the parameters and variables to the optimal operating point and instead, account for fewer than all of these objectives.

Figure 2:
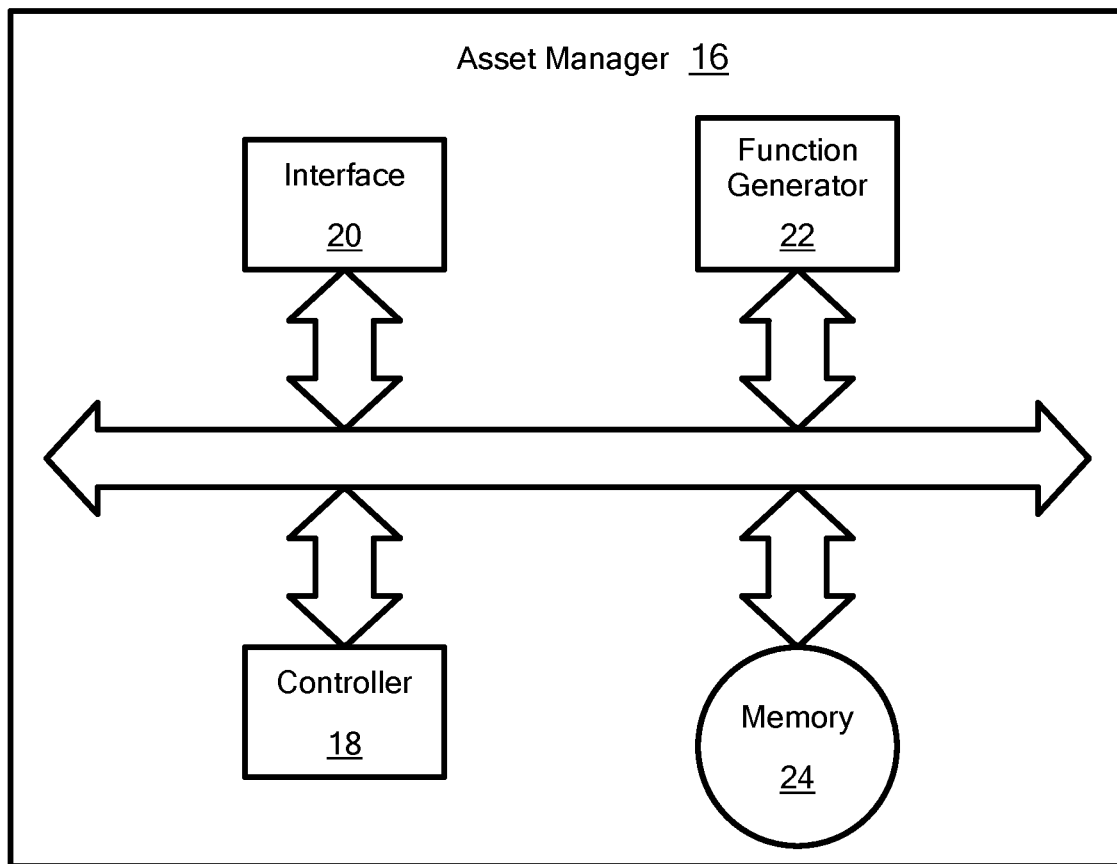
FIG. 2 schematically shows an asset manager configured in accordance with illustrative embodiments of the invention.

FIG. 2 schematically shows one of the asset managers 16 of FIG. 1 configured in accordance with illustrative embodiments of the invention. As shown, the asset manager 16 of FIG. 2 has a plurality of components that together perform some of its functions. Each of these components is operatively connected by any conventional interconnect mechanism. FIG. 2 simply shows a bus communicating each the components. Those skilled in the art should understand that this generalized representation can be modified to include other conventional direct or indirect connections. Accordingly, discussion of a bus is not intended to limit various embodiments.

Indeed, it should be noted that FIG. 2 only schematically shows each of these components. Those skilled in the art should understand that each of these components can be implemented in a variety of conventional manners, such as by using hardware, software, or a combination of hardware and software, across one or more other functional components. For example, the controller 18 (discussed below) may be implemented using a plurality of microprocessors executing firmware. As another example, the controller 18 may be implemented using one or more application specific integrated circuits (i.e., "ASICs") and related software, or a combination of ASICs, discrete electronic components (e.g., transistors), and microprocessors. Accordingly, the representation of the controller 18 and other components in a single box of FIG. 2 is for simplicity purposes only. In fact, in some embodiments, the controller 18 of FIG. 2 is distributed across a plurality of different machines—not necessarily within the same housing or chassis.

It should be reiterated that the representation of FIG. 2 is a significantly simplified representation of an actual asset manager 16. Those skilled in the art should understand that such a device may have many other physical and functional components, such as central processing units, communication modules, protocol translators, sensors, meters, etc. Accordingly, this discussion is in no way intended to suggest that FIG. 2 represents all of the elements of an asset manager 16.

The asset manager 16 thus includes the noted controller 18 configured to, among other things, use local cost functions to manage operation of its asset 14, and determine an operating point. The asset manager 16 also includes memory 24 for storing asset data, an interface 20 to communicate with the asset 14 and other devices, and a function generator 22 configured to produce a local cost function. Although the interface 20 may communicate with the asset 14 using a protocol that may be proprietary to its assigned asset 14, it preferably also communicates with the central controller 12 and/or other asset managers 16 using a communication protocol common to the microgrid 10. Each of these components and other components cooperate to perform the various discussed functions.

Accordingly, illustrative embodiments implement a decentralized dispatch approach. For effective operation, the cost function is minimized (e.g., using a Lagrange multiplier) and, by way of example, may be represented as follows:

$$\min_{P} J(P, x, \Theta) \quad (1)$$

$$\text{s.t.} \sum_{i} P_i = P_D$$

where J is the cost function,
P is a vector of the output of all controllable assets 14,
$P_D$ the "demanded power",
x is all the assets 14 states relevant to the cost function, and
$\Theta$ (theta) are external parameters relevant to the cost function.

As noted, in some embodiment implementing a decentralized dispatch approach, the "dual-decomposition" method may be used to allow the system cost function to be written as a combination of the cost functions for individual assets 14. In some embodiments, the optimization is framed as a "broadcast" and "gather" procedure, where a "master" device (e.g., the central controller 12 or asset manager 16 of one of the assets 14) is only required to perform a simple calculation. The bulk of the optimization is performed by each asset manager 16 in the DERs system 10 and/or the asset 14 itself.

The decentralized approach may be considered a "virtual market" in which a signal generated in a coordinated DERs system acts as a "price signal", that increases in value when there is more demand than supply of energy, and decreases when there is more supply than demand, and it is used by the asset managers 16 to determine the asset response of their own assets 14. The asset response is the determination of the real and reactive power outputs of the asset obtained by minimizing a cost function of a plurality of its variables with respect to power. Illustratively, at least one of the following may be used to make the virtual market function efficient, accurate, and generic:

I. One or more techniques implement the market without detailed knowledge of loads and renewable generation, II. One or more techniques extend the framework to other energy types, III. One or more techniques automatically construct a cost function in the assets 14, IV. One or more techniques incorporate assets 14 with discontinuous power output or consumption, and V. One or more techniques extend the virtual market concept to multiple DERs systems.

Each of the above as implemented in various embodiments and is explained further in the corresponding sections that follow.

I) Implement the market without detailed knowledge of loads and renewable generation.

One drawback of many optimization techniques known to the inventors is that they typically require knowledge of the power consumed by the loads and generated by all sources at all times to determine the value of the demanded power $P_D$ in Eq. 1. This is often hard to achieve because it requires many technical challenges, such as monitoring points, causing an increase in the cost and complexity of the system, as well as making it more prone to failure.

Figure 3A:
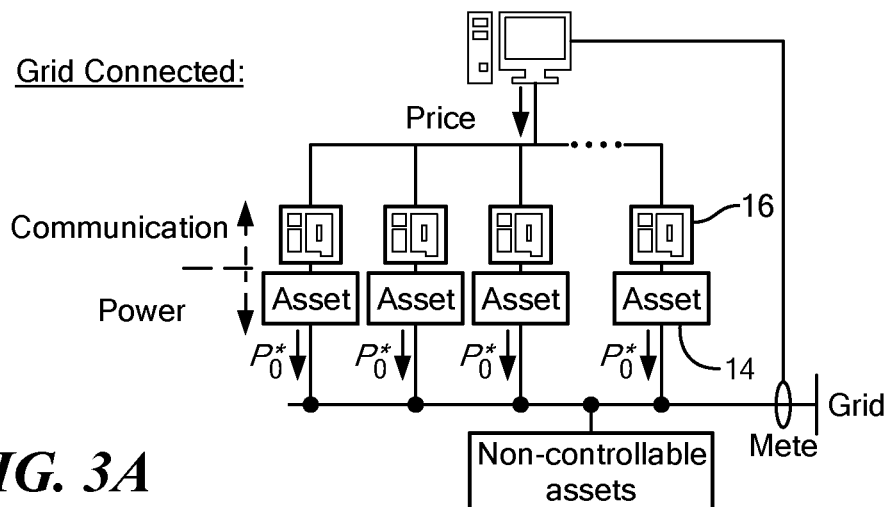
FIG. 3A-3C schematically shows the different types of use cases for microgrid control: Grid connected, off-grid (Master-Slave), and off-grid (Droop).

The inventors recognized, however, that even without knowledge of the exact load and renewable generation:

1) when a microgrid 10 is connected to the grid, only one power flow monitoring point is required to fully implement the virtual market and 2) when the microgrid 10 is off-grid, no additional monitoring points are required at all. The following analysis of each use case is presented:

Grid-connected systems:

As shown in FIG. 3A, all assets calculate their optimal power output ($P_0^*$), and the price signal is generated measuring the power sent to the grid and compared to the desired power to be sent to the grid. If more power is sent to the grid than desired, then there is excess energy and price decreases. The opposite for when less power is sent to the grid than desired.

In various embodiments the demanded power is calculated as follows:

$$P_D = \sum_i P_i + \Delta P_{grid} \quad (2)$$

where Pi is the output of a controllable asset 14 (which is known), and $\Delta P_{grid}$ is the difference between the power flowing to the grid and the desired power flowing to the grid. The amount of power that is desired to flow to the grid (to achieve a particular service to the utility) is determined by the central controller 12 or a peer asset manager 16. Illustrative embodiments only need to measure the power flowing to/from the grid to run an optimization (i.e., one monitoring point only). By reviewing this equation, the inventors recognized that information for renewable generation and for loads is not required to calculate demanded power.

Off-grid systems, Master-Slave control:

For an off-grid system, in various embodiments, the approach used to calculate demanded power may be determined based on whether the system is in master-slave mode or droop control mode.

Figure 3B:
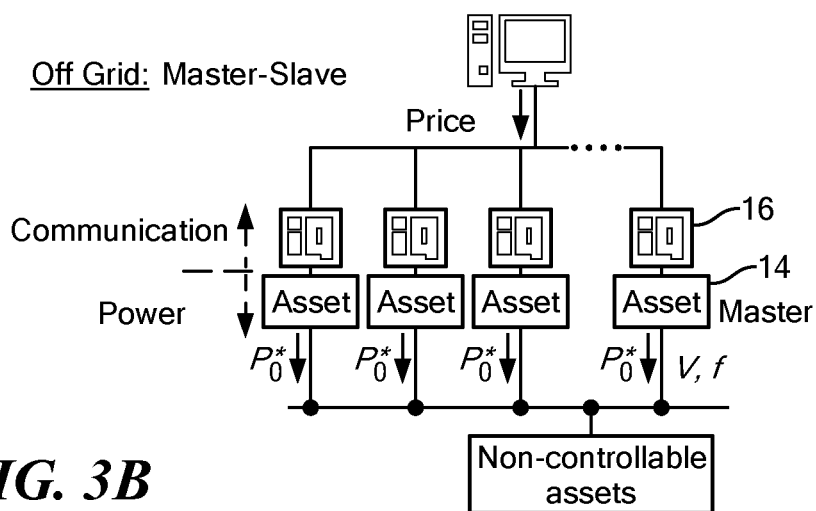

In Master-Slave control architectures, as shown in FIG. 3B, one of the controllable assets 14 operates as a Master (i.e., it sets the voltage and frequency) and the rest of the assets 14 operate as Slaves (i.e., they inject real and reactive power). The Master cannot set its output power, since it is determined by the system, and so there is an error between what the Master desired output is and real output ($\Delta P_M$). This difference is used to calculate the price signal. The demanded power is calculated as:

$$P_D = \sum_{slaves} P_i + \Delta P_M \quad (3)$$

It is the sum of the power injections by the slave devices (which are known) plus $\Delta P_M$. Specifically, $\Delta P_M = P_M - P_M^*$ is the difference between the power produced by the Master source ($P_M$) and the power that the Master source should produce ($P_M^*$). Since the Master source is a controllable asset 14, the value of its output power is known. And since the asset 14 participates in the "virtual market" optimization (i.e., the Master source sends bids and receive prices just as any other asset 14, even though it is not dispatchable), the amount of power it should produce to operate in the most optimal point is known. Therefore, no additional measuring points are needed to implement the optimization.

It should be noted that the equations for grid-connected and off-grid systems are the same if the grid itself is considered to be a Master source. The difference is that the power produced by the Master in the off-grid case is automatically known, whereas the grid-connected case requires a measurement of the grid's power flow.

Off-grid systems, Droop control:

In droop-controlled microgrids, there is no concept of Master or Slave sources because all assets 14 simultaneously react to changes in system loads and generation by varying individual output voltage and frequency. In such a system, all assets act like Masters, they all calculate their optimal output but cannot set it, so there is an error in all assets ($\Delta P_0$). The aggregation of all errors is used to calculate the price signal. Because of this, the sum of these differences ($\Delta P_i$) will be the demanded power by the system.

$$P_D = \sum_i \Delta P_i \quad (4)$$

In some embodiments, the fact that the assets 14 are implementing a droop function is relied on to calculate the demanded power (based on the network's droop coefficients and the associated changes in voltage and frequency). For example, if the assets 14 are implementing a P-f droop, in some embodiments the demanded power is calculated as:

$$P_D = (f - f_{ref}) \sum_i m_{P,i} \quad (5)$$

where:
f is the measured frequency,
fref the nominal frequency, and
Mpi the Pf droop coefficient for each individual controllable asset 14.

Thus, as in the previous two cases, no measurement of load or renewable generation is needed to implement this equation. In addition, although other droop implementations (such as power-voltage relationships) will lead to different equations, the result is the same.

II.) Include Additional Energy Types in the Optimization Framework

The description above relates to optimization around the assets' 14 real power output $P_i$. However, by analyzing systems in terms of analogies, the framework described above operates as well for other energy types, including reactive power, heat, hydrogen, diesel fuel, gas, etc. The same equations described above can be used by defining a "demanded power" for virtually any energy type (e.g., reactive power or heat), calculating a price signal for it following demand and supply rules, sending the price to all asset managers and allowing them to calculate an operating point for the new energy type using a local cost function.

Figure 4A:
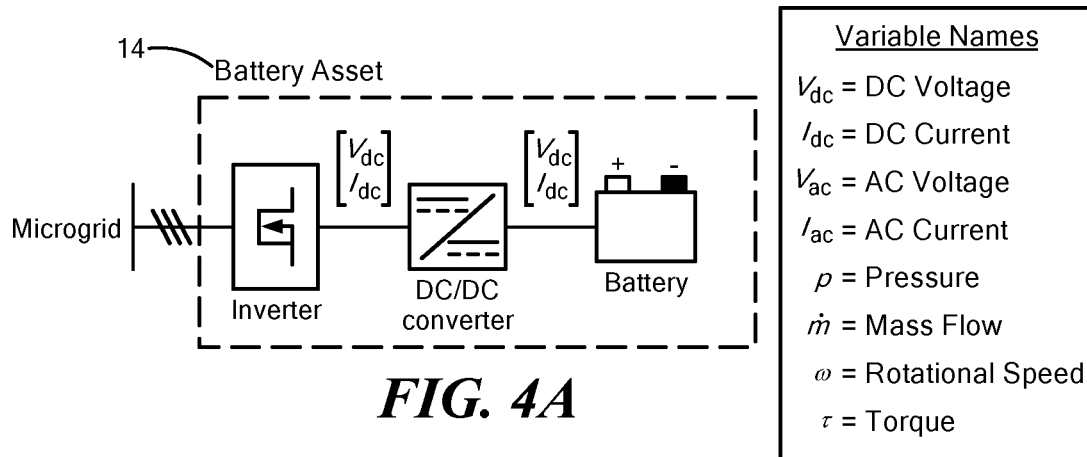
FIGS. 4A-4C schematically show ways in which the asset can be constructed in accordance with illustrative embodiments of the invention.
Figure 4B:
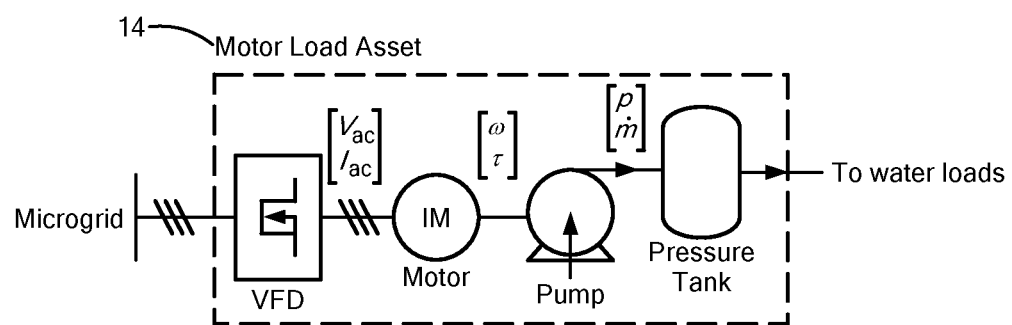
Figure 4C:
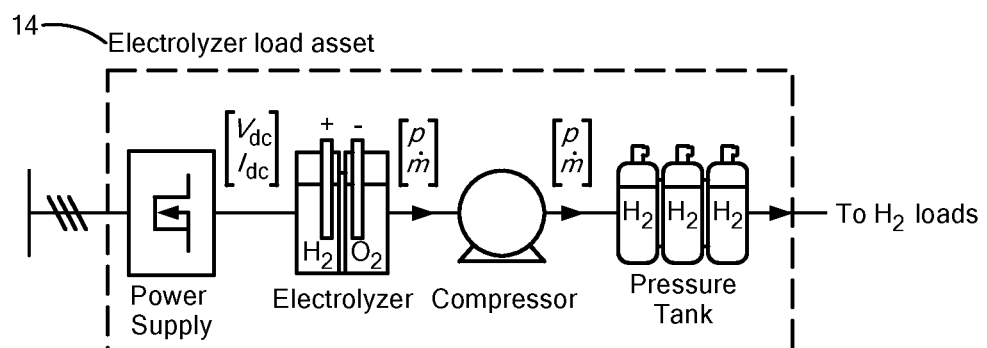
Figure 5A:
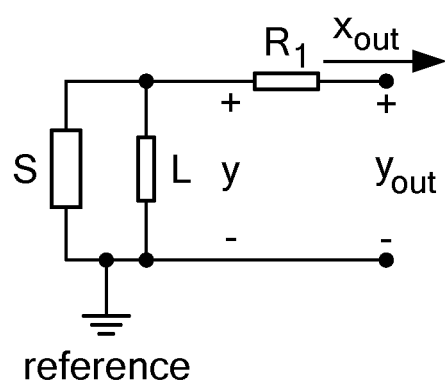
FIGS. 5A-5D schematically show building blocks to determine the fundamental input variables for loss calculation.
Figure 5B:
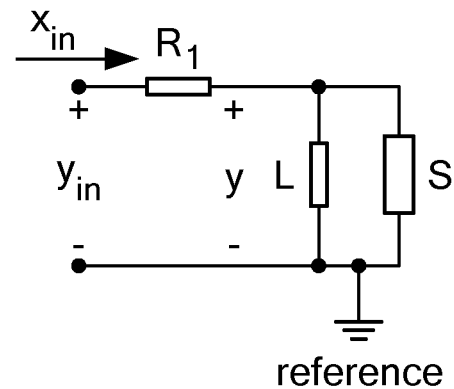
Figure 5C:
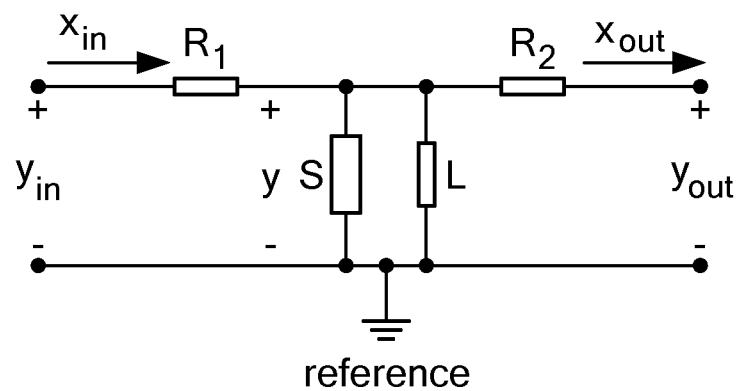
Figure 5D:
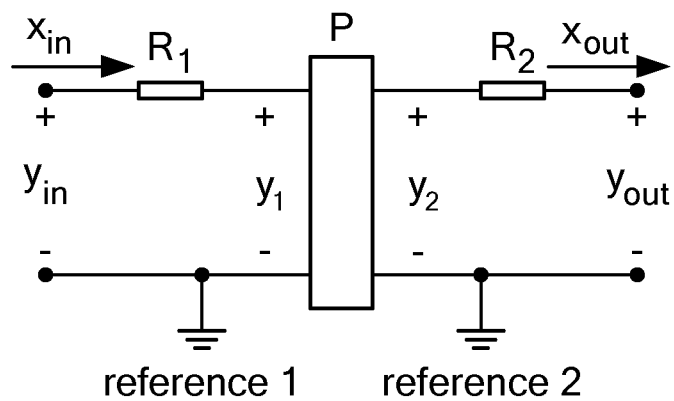

Cost function calculation for different energy types can also make use of analogies. FIGS. 4A-4C show three different but equivalent systems. All three tie to the power system through a specific device (e.g., inverter, VFD, power supply, etc.), referred to as a "system interactive device" ("SID"). In each system, there are also one or more power processing devices (e.g., DC/DC converter, motor, pump, electrolyzer, compressor, etc.), and finally one or more storage devices (e.g., battery, pressure tanks, etc.).

In the connections between the SID, power processing devices, and storage components, there is a pair of variables that transmit the power through a medium (e.g., wires, pipes, shaft, etc.): (1) An across variable that is measured from a point in the medium and a reference (examples shown in FIGS. 4A-4C are $V_{dc}$, $V_{ac}$, rotational speed $\omega$, pressure p); and (2) a through variable that is measured flowing through the medium (examples shown in FIGS. 4A-4C are $I_{dc}$, $I_{ac}$, torque T, mass flow). The efficiency associated with the SID, each power processing devices, and storage components can be calculated from the power flows at both ends of a power device, or with the input energy to a storage device. A further construction can be completed for a more detail analysis of the losses associated with a device to analyze serial losses (associated with the through variables) and parallel losses (associated with the across variables). An example of the former is the copper loss on the wires connecting a battery to an inverter or the pressure drop in a pipe, while an example of the latter is the self-discharge of batteries or leakage in pressurized hydrogen tanks. FIGS. 5A-5D show examples of how the losses elements (serial R, parallel L) of the four asset types sources, loads, bidirectional elements and power processing. In those figures, S represents a storage reservoir and P and ideal processing device (no losses). In addition, "x" is a through variable, and "y" an across variable. The concept of price signal for energy types distinct from electricity can also be used.

III.) Construct the Cost Function in the Assets 14

One technical optimization challenge involves determining how to create the cost function for each asset 14. As discussed above, the cost function is often a combination of pre-determined terms: 1) the power rating capability of the asset, 2) the real efficiency of the asset, which can vary depending on factors such as state of charge, temperature, etc., 3) the long-term effects of a given operation on the asset (e.g., battery degradation due to charge/discharge cycles), 4) the asset's opportunity cost (i.e., the ability of an asset to change its operation in the present time to obtain more value in the future), and 5) the response limitations of the asset. Illustrative embodiments determine these cost function terms with machine learning techniques and other means. By measuring input and output variables at each asset 14 over time, various embodiments can accurately calculate many different cost drivers, such as the actual efficiencies of an asset 14 as a function of multiple variables.

For example, consider a cost function used to estimate losses within a battery. It is possible to construct an appropriate relationship of energy loss with a number of variables, and then use that function in the optimization framework. Losses, however, will likely depend on various dynamically changing properties, such as the amount of power being processed, the temperature of the battery, the temperature of the inverter, the state of charge of the battery, the grid voltage, etc. This underlying complexity historically leads to heuristic simplifications of the cost function, which undesirably can result in inaccurate estimates. The same holds true for the cost functions of other types of assets 14, including those of diesel generators, gas turbines, hydrogen electrolyzers, thermal storage systems, etc.

To mitigate these technical problems, illustrative embodiments use machine learning techniques to create and continually refine asset cost functions. The discussed decentralized microgrid 10 is well suited for this approach: every asset 14 can monitor its own variables at a higher rate, leading to higher accuracy and faster convergence. For example, a regularized least squares regression technique may be used. In some embodiments, quadratic relationships between each variable associated with asset 14 losses/efficiencies may be used to estimate the impact of asset 14 variables on cost.

Two challenges may arise, however, from this approach.

(a) The amount of data needed to be stored and processed is substantial and consequently, possibly impractical, and (b) The choice of variables from inputs in the learning algorithm may provide poor results if these variables do not accurately encompass key drivers of the underlying cost functions. Each of these technical problems and corresponding technical solutions is discussed immediately below.

(a) The amount of data needed to be stored and processed is impractical.

Figure 6:
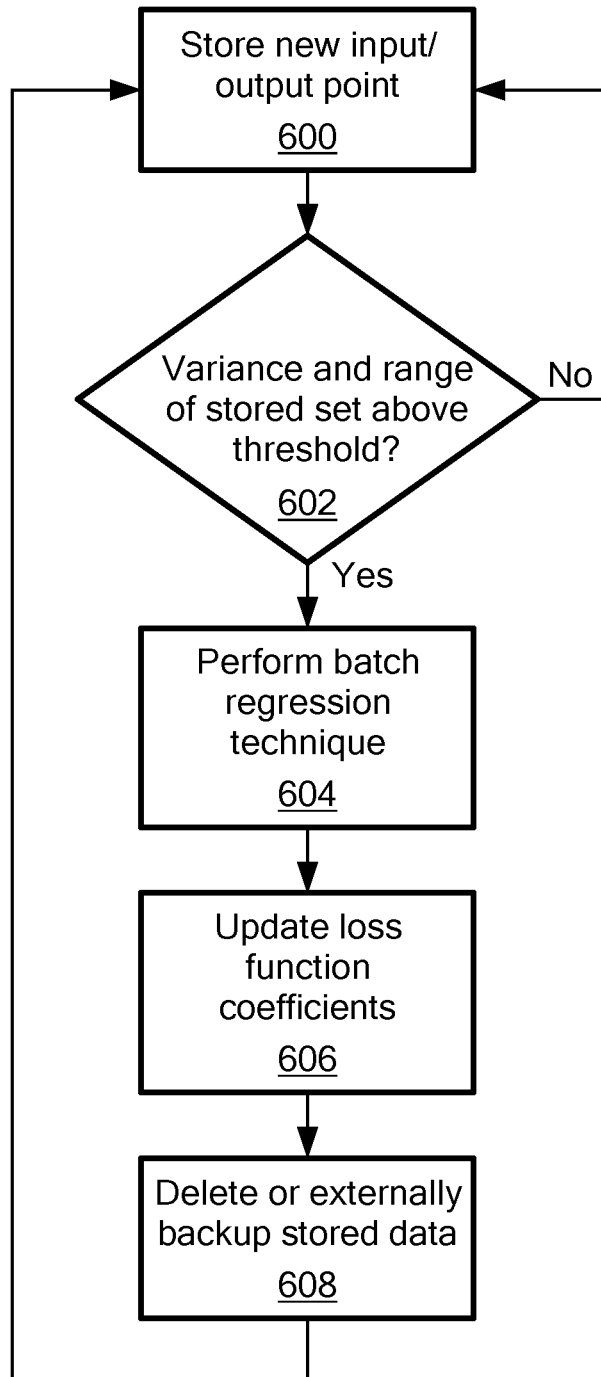
FIG. 6 shows a process of calculating the range and variance of a set of input values and waits until they both exceed a threshold.

The use of machine learning can result in the accumulation of a large amount of data. In addition, the data might be mostly redundant. For example, various states of an asset 14 might stay the same for some time period (e.g., constant frequency set point), so significant amounts of data may not be worth storing. In various embodiments, one or more of the following techniques mitigate and/or resolve these technical issues:

i) Define a minimum change in at least one state for the input/output pair to be stored for future processing, ii) Use of purely online learning technique for cost calculation. This is useful because only the present relevant input/output data is required to refine the cost calculation, so there is no need to store large amounts of data. A disadvantage is that this likely would be less accurate than batch algorithms, iii) Use of a combination of batch and online learning with a function determining when enough information has been gathered to perform a new regression. This technique calculates the range and variance of a set of input values and waits until they both go above a threshold. FIG. 6 shows a process of implementing a procedure for such a solution. The process may be performed in whole or in part by the asset manager 16, its controller 18, and/or another device (e.g., the central controller 12). It should be noted that this process is substantially simplified from a longer process that may be used to measure the object. Accordingly, the process can have many steps that those skilled in the art likely would use. In addition, some of the steps may be performed in a different order than that shown, or at the same time. Those skilled in the art therefore can modify the process as appropriate.

The process of FIG. 6 begins at step 600 by storing a new input/output point, and then determining (step 602) if the variance and range of the stored data is above a threshold. If not, the process loops back to the beginning step 600. If above the threshold, however, then the process continues to step 604 by performing a batch regression technique, updating loss function coefficients (step 606), and deleting or externally backing up stored data (step 608). The process then loops back to the first step 600 to repeat the process. Accordingly, this process is intended to update the loss function coefficient while limiting unnecessary data storage.

(b) The choice of variables for inputs into the learning algorithm will provide poor results if these variables do not accurately encompass key drivers of the underlying cost functions.

Selecting the input variables for the regression technique requires knowledge of the asset 14 under consideration. In some embodiments, the following approach can select such set of input variables for any type of energy resource. First, energy resources are divided into the following building blocks.

Sources: Their power flow is unidirectional from a reservoir (internal or external to the system) into the system. This could be the microgrid utility connection, the gas flow from the gas utility, the diesel flow from a diesel tank, etc.

Loads: Their power flow is unidirectional from the system into a reservoir (including its conversion into heat or work). Lighting and HVAC systems are examples of loads.

Bi-directional storage: Assets 14 with bi-directional power flow and thus, they can take power or return power into a reservoir. Examples include electrical batteries and thermal storage systems.

Power processing: Assets 14 that take one form of energy and convert in a different form. Examples include inverters, heat exchangers, diesel generators, etc.

Various embodiments optimize the microgrid 10 at least in part by first associating an asset 14 with a generic cost function and then improving the cost estimate over time. As an example, one might set the initial cost function for all assets 14 to have a constant efficiency with respect to power, only to update the function appropriately based on actual data. The same can be done for other variables in the same way. FIG. 4A-4C show how the approach for efficiency calculation can be applied to a system of multiple energy types, and FIGS. 5A-5D show a possible generic representation of where the losses are expected in the four asset types discussed above.

Figure 7:
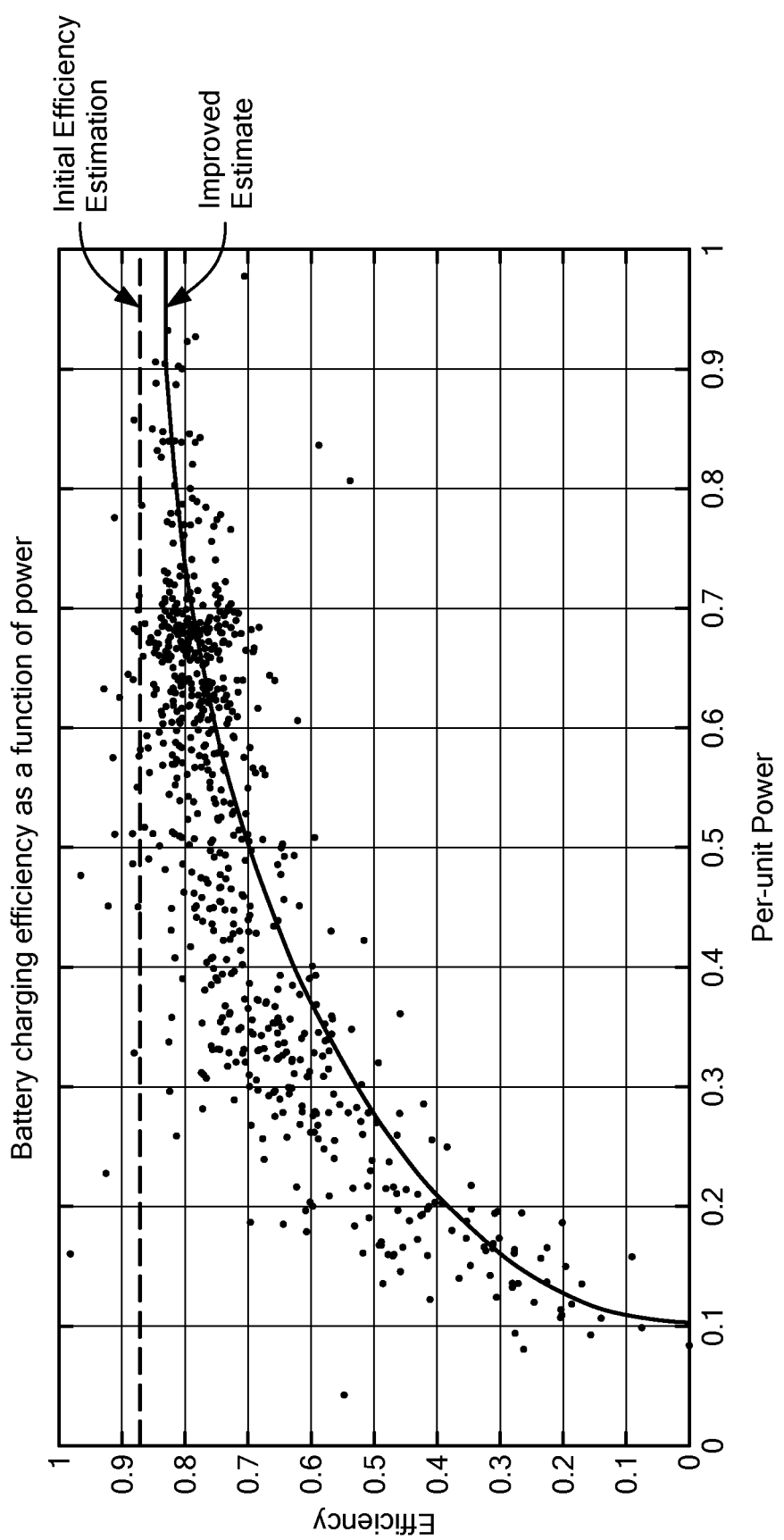
FIG. 7 graphically shows an example of using a non-uniform sequence of future times that can range from very fast (e.g., sub-second and second) to very slow (e.g., hours and days), to leverage the weighted sum of future costs in those time ranges, as the cost function to minimize.

In various embodiments, the system learns over time better ways to dispatch the assets 14. There is no need for manual customization, and this general framework provides a powerful starting point for calculating an asset's loss or efficiency. Apart from these fundamental variables, it should be noted that illustrative embodiments also include external parameters that affect losses (ambient temperature, humidity, etc.) in the machine learning algorithms. To illustrate this, FIG. 7 graphically shows how efficiency can be calculated using real data to then use it in the function generator 22 to construct the cost function for the asset 14.

Figure 8:
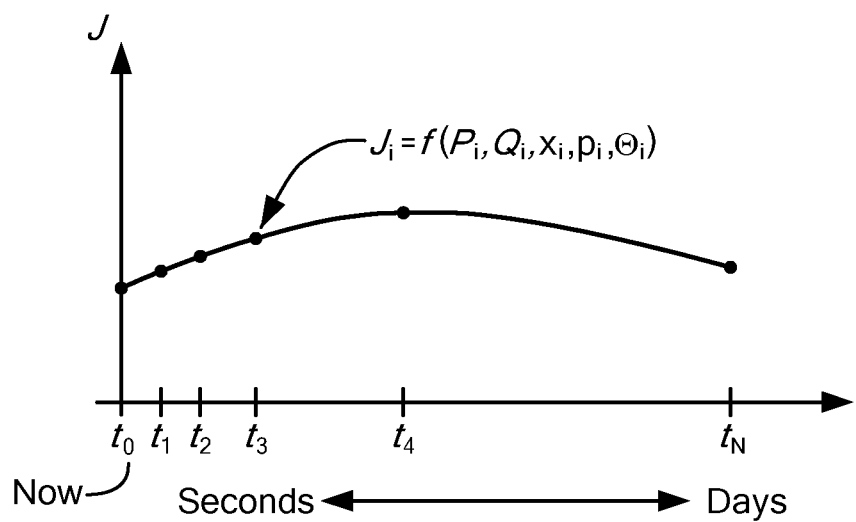
FIG. 8 graphically shows an example of an overlap in ranges leading to a hysteresis region that can avoid instabilities in a virtual market during operation.

In various embodiments, as shown in FIG. 8, the asset managers 16 can combine variables measured at the present time from the asset 14 with variables estimated for future times to calculate the cost function at future times. It is possible that the "price signal" at future times can also be given by an external device, although that is not a requirement as it can also be estimated by each asset manager 16.

The asset 14 response is calculated by minimizing a weighted sum of the cost functions at present and future times. The future times can be uniform or non-uniform and range from very fast (i.e., sub-second and seconds) to very slow (i.e., hours and days).

In various embodiments, the asset managers 16 can change the asset 14 operation in the present time to obtain more value in the future. This may be achieved by accounting for future values, stored energy variables and degradation variables in the cost function. The impact of those variables on the cost function can be adjusted within a range with tunable parameters. This capability gives each asset manager 16 some ability to change its own asset's 14 cost function to try to maximize its performance. The asset's performance measure is completed on each asset independently and is given by the "revenue of the asset", which is defined as the integral over time of the "price signal" multiplied by the optimal output power found by the minimization of the cost function. This technique can be applied in a discrete or continuous time and fosters "competition" between all the assets in the DERs system to maximize their own revenue, where each asset changes its own parameters based on its own predictions about the future.

Figure 10:
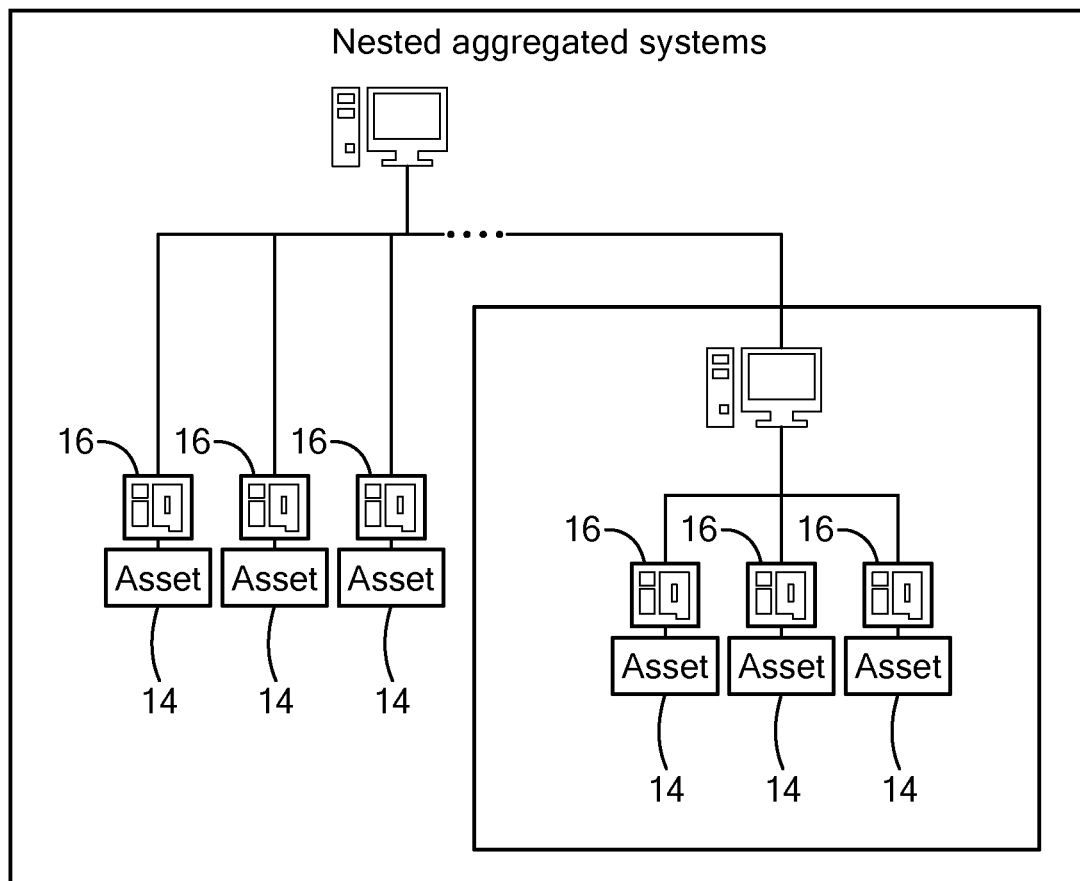
FIG. 10 schematically shows nested aggregated DERs systems.

The disclosed optimization technique advantageously can be applied to various embodiments of DERs systems, such as a system of individual microgrids 10 as well as individual assets 14. Consider the example shown in FIG. 10, where one or more microgrids 10 (or other system) can participate alongside one or more individual assets to form a nested system (e.g., systems inside systems) under a utility feeder. Each individual microgrid 10 and asset could participate (and bid) into this larger virtual market. The resulting dispatch command for the microgrids becomes the "Demanded" power within a microgrid 10, which becomes an input into the internal optimization for each individual asset 14.

In this nested optimization scheme, in some embodiments, a new demanded power for the feeder results in a "price signal" that is send to every microgrid 10 and independent asset 14. Each microgrid 10 and asset 14 can then adjust its output power based on their individual cost function. The construction of a cost function of a microgrid 10 can be determined with either a rule-based approach or a market-based system; i.e., the individual microgrids 10 can use the same optimization price signal procedure to dispatch their internal assets 14.

Accordingly, illustrative embodiments may be used to build distributed virtual markets for microgrid optimization. The optimization of microgrid operations can be improved by performing any one or more of the following, as discussed above:

1. Implement the market without detailed knowledge of loads and renewable generation.
2. Extend the framework to other energy types,
3. Construct a cost function in the assets 14,
4. Incorporate assets 14 with uncertain or discontinuous power output or consumption.
5. Extend the virtual market concept to the optimization of multiple microgrids 10.

Figures 9A, 9B:
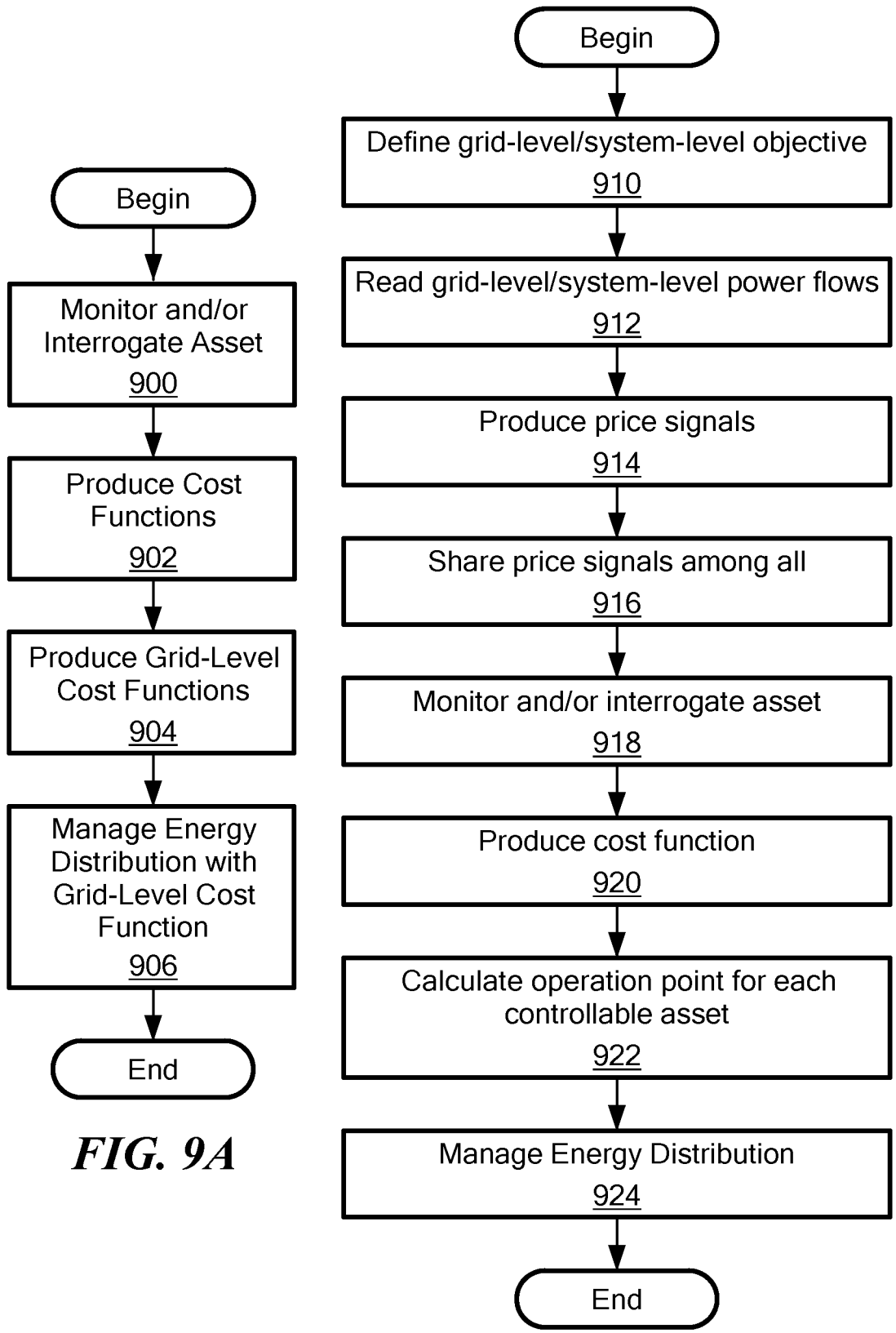
FIG. 9A shows a generalized process of managing a grid in accordance with illustrative embodiments of the invention.
FIG. 9B shows a more specific process of managing a grid in accordance with illustrative embodiments of the invention.

Accordingly, FIG. 9A shows a generalized process of managing a grid (e.g., a microgrid 10) in accordance with illustrative embodiments of the invention. In a manner similar to FIG. 6, this process may be performed in whole or in part by one or more of the asset managers 16, and/or other device(s) (e.g., the central controller 12). It should be noted that this process is substantially simplified from a longer process, and details of various implementations are discussed above. The process therefore can have many steps that those skilled in the art likely would use. In addition, some of the steps may be performed in a different order than that shown, or at the same time. Those skilled in the art therefore can modify the process as appropriate.

The process begins at step 900, in which each asset manager 16 interrogates its assigned asset 14. To that end, the controller 18 of each asset manager 16 may simply receive, via its interface 20, real time and non-real time operational data from its asset 14, and information related to its asset 14 (e.g., temperature local to the asset 14). In addition, the controller 18 may forward signals to the asset 14 to determine other information about the asset 14, such as its reaction to certain stimuli, and information requiring requests for access.

For example, as noted above, the cost function of one or more of the assets 14 may include at least a portion relating to response limitations of the asset 14 relative to a function of the asset 14. Among other things, such a response limitation may include the maximum amount of power the asset 14 may produce. Thus, the controller 18 may command its asset 14, via the interface 20, to produce a given response with response data from the given asset 14, and then measure the response data from the asset 14. The asset managers 16 may store and retrieve relevant information in its memory 24, which may include one or both of long-term and short-term data storage.

Illustrative embodiments may interrogate using other techniques. As a second example, a given asset 14 may have an asset efficiency at a given operating point, and that asset 14 may have a cost function that is inversely proportional to its efficiency at the given operating point. Thus, the controller 18 may provide commands to the given asset 14 to produce a response with response data from the given asset 14 and measure the response data. The controller 18 may use that measured response data to calculate efficiency as a function of multiple variables. The function generator 22 then may use the calculated efficiency to produce the local cost function of the given asset 14 (e.g., during below discussed step 902).

As a third example, the controller 18 may receive, via the interface 20, operating data from a given asset 14, and use the operating data to determine given asset response time. The desired result of the cost function minimization is the optimal output powers at present and in future times (P*); and since, assets 14 might not always react immediately to a command, usually taking some time to start (while staying in its current output power) and then ramping to the new value (ramp rate), the optimal output (P*) must be adjusted to the shape given by the response limitations. In this method, the "response limitations shape" must shift to the left continuously to account for the fact that the command was sent. In some cases, an asset might decide to avoid sending any other command until the "response limitation shape" has been shifted completely out to the left. The "response limitations shape" might not be known a priori, but the asset manager 16 can learn it over time. Illustrative embodiments may use two methods to account the response limitations: (1) Find the optimal response as if there were no limitations and then force them afterwards, or (2) solve the optimization of the cost function as a constrained problem.

Figure 11:
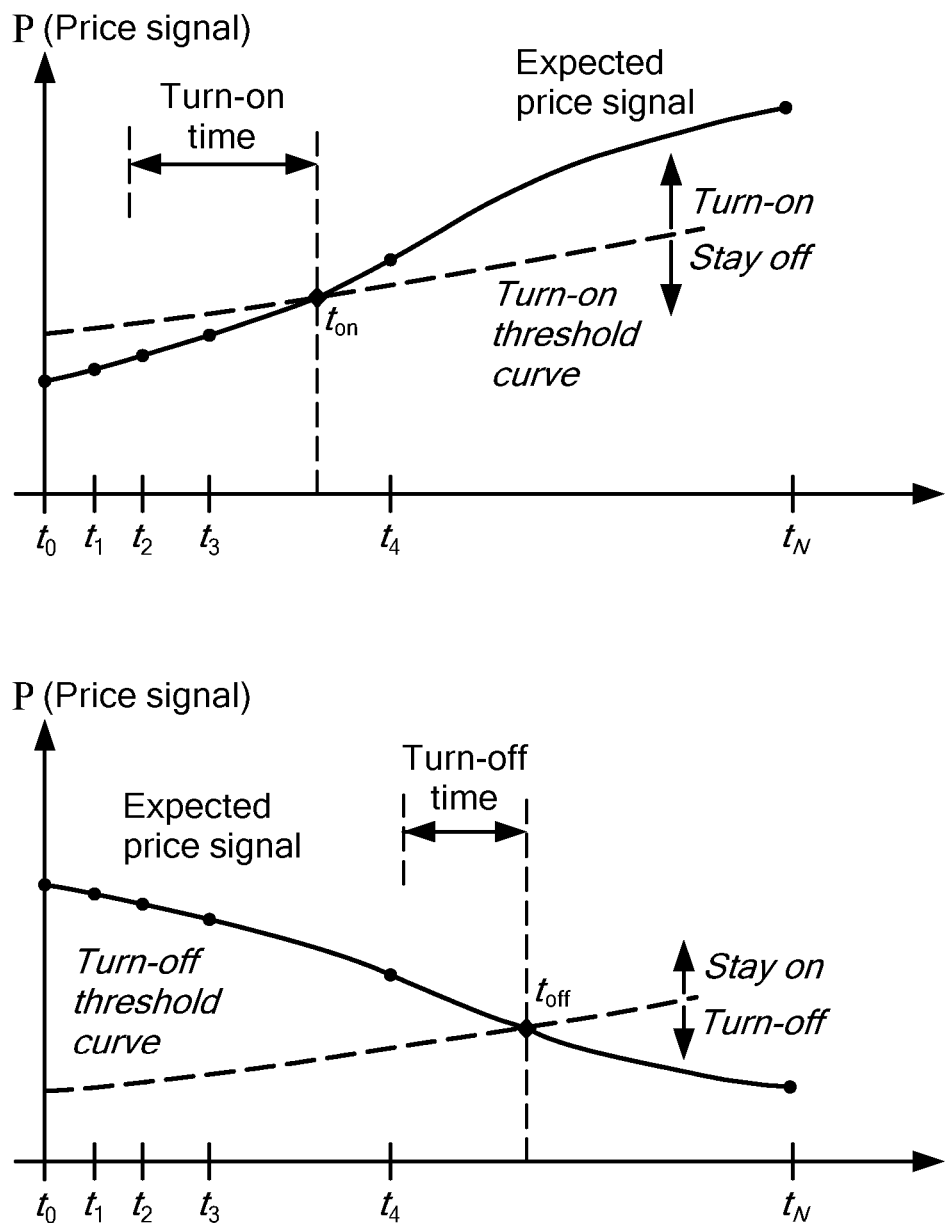
FIG. 11 graphically shows an example of using real data to learn the turn-on, turn-off times of the assets, and leveraging those to define the optimal turn-on and turn-off conditions.

As a fourth example, the controller 18 may receive, via the interface 20, operating data from a given asset 14, and use the operating data along with the expected price signal in the future to determine the ideal turn-on and turn-off conditions and times of the asset 14, as shown in FIG. 11 (discussed below). Assets can be on or off, and some might take a significant amount of time to change their state, making the decision of when to turn-on and off an impactful one. Asset managers 16 can define and use turn-on and turn-off threshold curves and compare them with the expected price signal, to determine when a start or stop command should be sent to the asset. Consider the case when an asset is off:

If the "turn-on threshold curve" intersects the "expected price signal" curve, an "on time" ($t_{on}$) when the asset should be operational can be defined. The start signal must be sent if "$t_{on}$" is less than the "turn-on time" of the device. The exact same procedure can be done to determine when to stop an asset. The turn-on and turn-off threshold curves should be different to give the on and off conditions some hysteresis and can be modified depending on the asset conditions (e.g., state of charge, fuel level, etc.). As with the response limitations, the turn-on and turn-off times of an asset 14 might not be known a priori but can be learned by the corresponding asset manager 16 over time.

Figure 12:
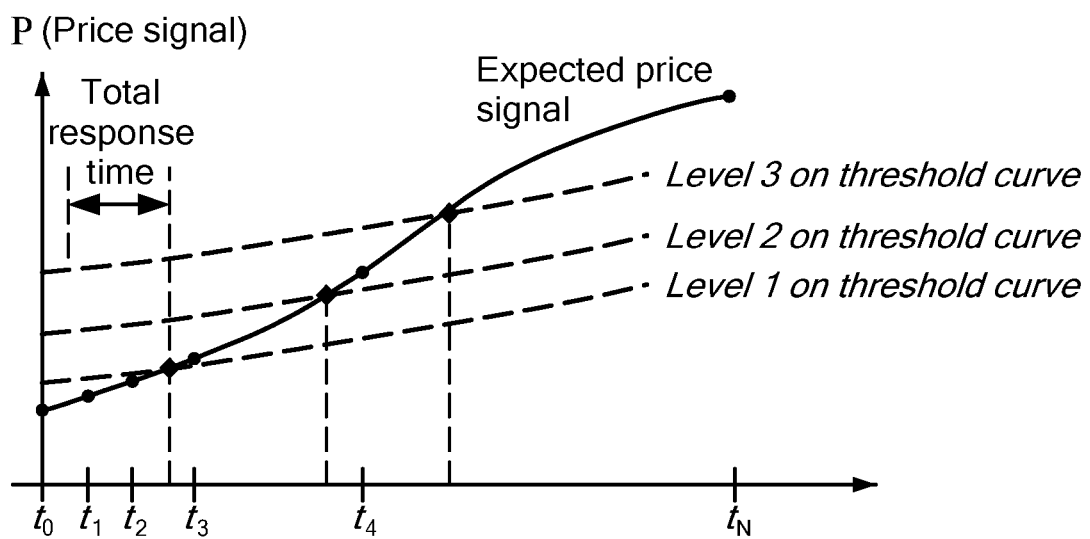
FIG. 12 graphically shows an example of defining level threshold curves and using those to change the output power of an asset within discrete power levels.

As yet a fifth example, the controller 18 may receive, via the interface 20, operating data from a given asset 14, and use the operating data to extend the concept of turn-on/turn-off conditions and apply threshold curves to assets that have discrete power levels, as shown in FIG. 12 (discussed below). There must be a level on and level off threshold curve to provide a hysteresis to the response an avoid oscillations.

Thus, using the information from the memory 24 and/or controller 18 of step 900 (among other information), the function generator 22 generates a local cost function for the given asset 14 as discussed above (step 902). Moreover, each asset manager may determine, using the local cost function, an operating point for the given asset, and then use the determined operating point for the given asset to manage operation of the given asset in the DERs system. Using the plurality of local cost functions, step 904 then produces a system cost function. As also discussed above, the central controller 12 may complete this step and communicate with the asset managers 16 via their interfaces 20.

Finally, at step 906, an asset manager 16 and/or the central controller 12 may manage energy generation and/or distribution in the microgrid 10 using the system cost function. As discussed above, management preferably is dynamically controlled based on changing conditions in the microgrid 10 and assets 14, which can dynamically change the local cost functions—consequently dynamically changing the system cost function. Accordingly, compared to centralized prior art management schemes discussed above, managing the microgrid 10 in this local and distributed manner enables the local asset managers to more rapidly and efficiently generate their local cost functions, which can be more easily integrated into the system cost function.

FIG. 9B shows a more specific process of managing a grid in accordance with illustrative embodiments of the invention. In a manner similar to FIGS. 6 and 9A, this process may be performed in whole or in part by one or more of the asset managers 16, and/or other device(s) (e.g., the central controller 12). It should be noted that this process is substantially simplified from a longer process, and details of various implementations are discussed above. The process therefore can have many steps that those skilled in the art likely would use. In addition, some of the steps may be performed in a different order than that shown, or at the same time. Those skilled in the art therefore can modify the process as appropriate.

The process begins at step 910, which defines grid-level/system-level objectives, and then reads grid-level/system level power flows (step 912). Next, the process produces price signals (step 914) and then, at step 916, shares price signals among all. The process then monitors and/or interrogates the asset at step 918, and produces the cost function at step 920. The process then calculates the operation/operating point for each controllable asset at step 922, and concludes by managing energy distribution at step 924.

Figure 13:
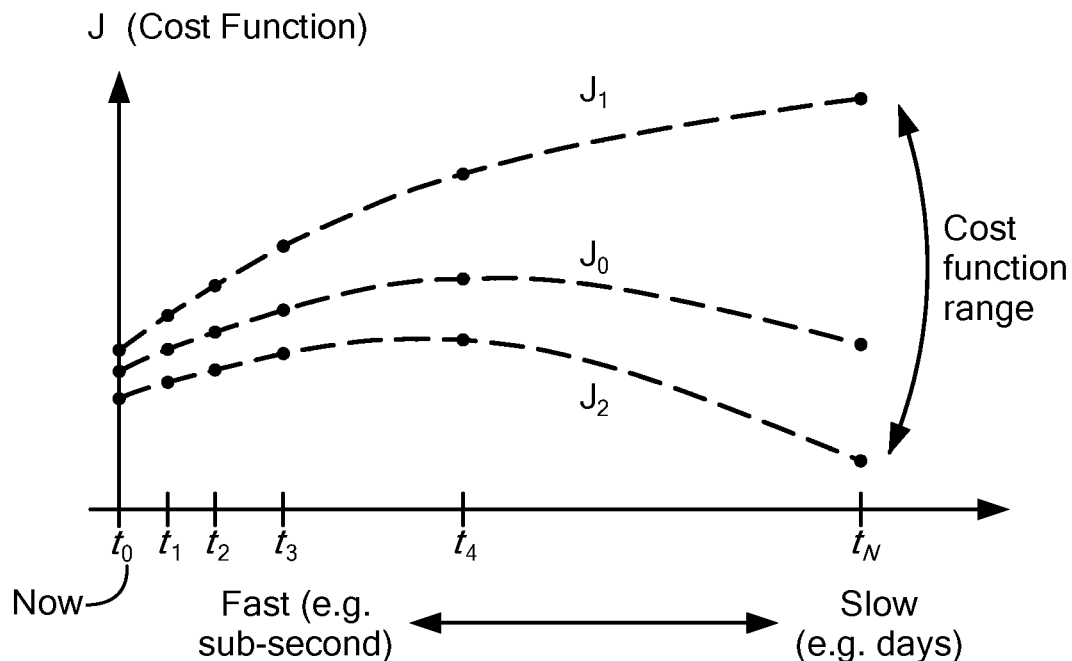
FIG. 13 graphically shows an example of using limited tunable parameters to adjust the cost function at each asset independently.

FIG. 13 graphically shows an example of using limited tunable parameters to adjust the cost function at each asset independently. As such, some embodiments use limited tunable parameters to adjust the cost function at each asset independently.

To that end, "opportunity cost" refers to the ability of an asset to change its operation in the present time to obtain more value in the future. This may be achieved by accounting for future values, stored energy variables, and degradation variables in the cost function. The impact of those variables on the cost function can be adjusted within a range with tunable parameters.

Accordingly, this concept gives each asset some ability to change its cost function in an effort to maximize performance. The performance measure preferably is completed at each asset independently, and is given by the "Revenue" of the asset. "Revenue" may be calculated as the integral over time of the price signal multiplied by the optimal output power found by the minimization of the cost function. It can be completed either in discrete or continuous time. This concept opens up a "competition" between assets attempting to maximize their own Revenue, with each changing its own parameters based on its own predictions about the future.

Figure 14:
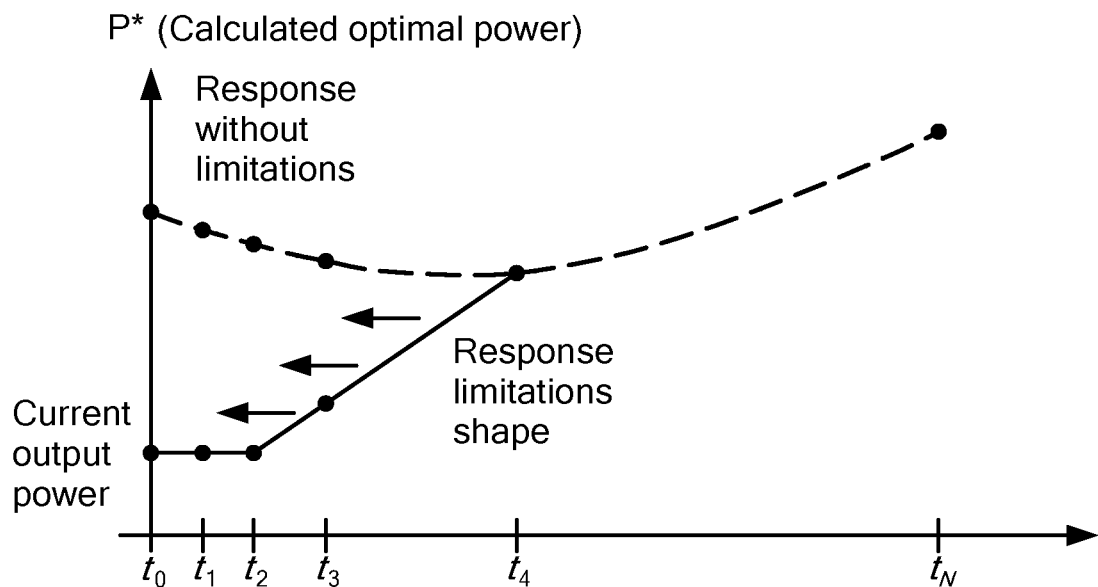
FIG. 14 graphically shows an example of accounting for the asset's response limitations to determine the asset optimal response and using real data to tune the response limitations parameters over time.
Figure 14:
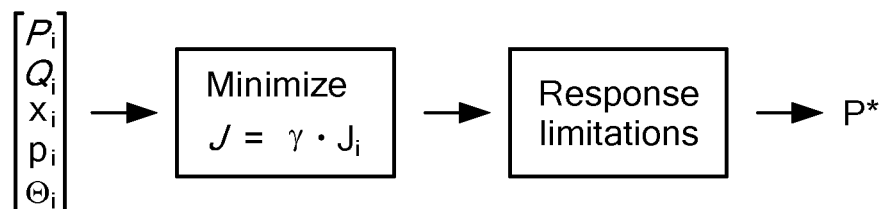
Figure 14:
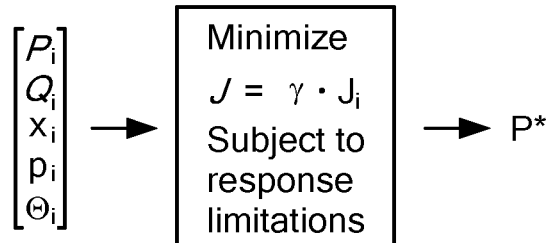

FIG. 14 graphically shows an example of accounting for the asset's response limitations to determine the asset optimal response and using real data to tune the response limitations parameters over time. The result of the cost function minimization is the optimal output powers at present and in the future times (P*). Assets typically do not react immediately to a command, but usually take some time to start (while it stays in its current output power) and then ramp to the new value (ramp rate). The optimal output (P*) preferably is adjusted to the shape given by the response limitations. Note that the "response limitations shape" has to shift to the left continuously to account for the fact that the command was sent. An asset might decide to avoid sending any other command until the "response limitation shape" has been shifted completely out to the left. Also note that the "response limitations shape" might not be known a priori, but the asset manager can learn it over time.

Various embodiments may use two ways to account for the response limitations:

Option 1: Find the optimal response as if there were no limitations and then force them afterwards, or Option 2: Solve the optimization of the cost function as a constrained problem.

FIG. 11, noted above, graphically shows an example of using real data to learn the turn-on, turn-off times of the assets, and leveraging those to define the optimal turn-on and turn-off conditions. Specifically, assets can be on or off, and some of them take a significant amount of time to change its state, making the decision of when to turn-on and off important. For example, a gas turbine might take 3-4 minutes to be ready to export power. Illustrative embodiments may use turn-on and turn-off threshold curves and compare them with the expected price signal to determine when the start or stop signal should be sent to the asset.

As an example, consider the case when an asset is off:

If the "turn-on threshold curve" intersects the "expected price signal" curve, an "on time" (ton) or can be defined. That is when the asset should be operational. The start signal will be sent if "ton" is less than the "turn-on time" of the device. The same procedure may be completed to determine when to stop an asset. The turn-on and turn-off threshold curves should be different to give the on and off conditions some hysteresis. Moreover, the threshold curves can be modified depending on the asset conditions (for example, state of charge, fuel level, etc.). As with the response limitations, the turn-on and turn-off times might not be known a priori, but can be learned by the asset manager 16.

FIG. 12, noted above, graphically shows an example of defining level threshold curves and using those to change the output power of an asset within discrete power levels. Specifically, illustrative embodiments extend the concept of turn-on/turn-off conditions by applying the same idea of threshold curves to assets that have discrete power levels. The concept is similar as the turn-on/turn-off. Preferably, a level on and level off threshold curve provide a hysteresis to the response and avoid oscillations.

Figure 3C:
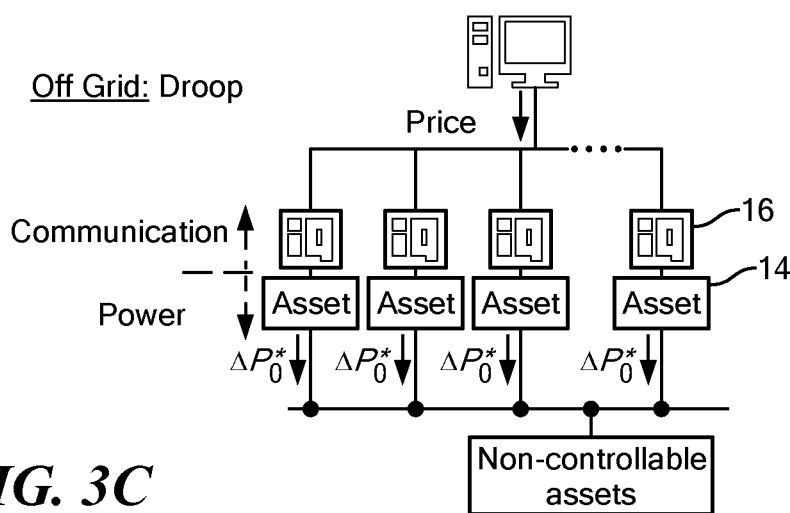

FIGS. 3A-3C, mentioned above, schematically show the different types of use cases for microgrid control: Grid connected, off-grid (Master-Slave), and off-grid (Droop). This concept illustratively applies for actual microgrids only. The typical implementation may include grid-connected, where all assets calculate their optimal power output (P0*), and the price signal is generated measuring the power sent to the grid and compared to the desired power to be sent to the grid. If more power is sent to the grid than desired, then there is excess energy and price decreases. The opposite for when less power is sent to the grid than desired.

In Master-Slave, all assets 14 (including Master) calculate their optimal output. The Master cannot set its output power (this is determined by the system), and so there is an error between the Master desired output and real output ($\Delta PM$). This difference is used to calculate the price signal.

In droop, all assets 14 act like Masters. In addition, all assets 14 calculate their optimal output but cannot set it, so there is an error in all assets ($\Delta PO$). The aggregation of all errors is used to calculate the price signal.

In the context of distributed asset managers 16, the above approach may be advantageous because of the way distributed asset managers 16 preferably are sited in front of microgrid assets 14, or simply assigned to control specific microgrid assets 14, and are able to collect data, process data, and dispatch assets 14 in real time. Some embodiments, as noted above, further may be applied to centralized optimization approaches.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. Such variations and modifications are intended to be within the scope of the present invention as defined by any of the appended claims.

Various innovations are listed immediately below, and those innovations may be combined to include one or more of the specified innovations:

1. An asset manager configured to control distribution of power within an aggregated distributed energy resources system ("DERs system") having a plurality of assets, the asset manager being configured to operate with a given asset in the DERs system, the asset manager comprising:

an interface configured to receive asset information relating to the given asset and to communicate with at least one other asset manager or a central controller in the DERs system;

a function generator operatively coupled with the interface, the function generator configured to produce a local cost function using data relating to the given asset only, the local cost function representing a portion of a system cost function for the overall DERs system; and a controller operatively coupled with the function generator, the controller configured to determine, using the local cost function, an operating point for the given asset, the controller also being configured to use the determined operating point for the given asset to manage operation of the given asset in the DERs system.

2. The asset manager of innovation 1 wherein the interface is configured to receive one or more cost functions from other asset managers, the controller configured to forward control signals to the other asset managers to manage distribution of energy of the DERs system as a function of the local cost function and the received one or more cost functions.

3. The asset manager of innovation 1 wherein the local cost function includes at least a portion relating to opportunity cost.

4. The asset manager of innovation 3 wherein the opportunity cost comprises tunable parameters that the controller is configured to modify to improve revenue of the given asset.

5. The asset manager of innovation 1 wherein the local cost function includes at least a portion relating to response limitations of the given asset relative to a function of the given asset.

6. The asset manager of innovation 1 further comprising:

the controller being configured, in response to receipt of commands to the given asset, to produce a given response with response data relating to the given asset, the controller being configured to measure the response data and calculate one or more response limitations of the given asset using the measured response data.

7. The asset manager of innovation 1 wherein the given asset has an asset efficiency at a given operating point, the local cost function being inversely proportional to the asset efficiency at the given operating point.

8. The asset manager of innovation 1 wherein the given asset has a power rating, the local cost function being inversely proportional to the power rating.

9. The asset manager of innovation 1 wherein the local cost function includes expected future conditions at non-uniform time intervals relating to the given asset.

10. The asset manager of innovation 1 wherein the controller is configured to receive operating data from the given asset, and then use the operating data to determine given asset response time and/or given asset efficiency, the function generator using the given asset response time and/or the given asset efficiency to produce the local cost function of the given asset.

11. A method of distributing power from an aggregated distributed energy resources system ("DERs system") having a plurality of assets, the method comprising:

using a plurality of asset managers to manage the assets, each asset including a local dedicated asset manager separate from the other asset managers or a central controller, each asset manager having an interface to receive asset information relating to its asset;

for each asset, producing a local cost function using its local dedicated asset manager, each local dedicated asset manager producing its local cost function using data relating to its local asset only, the cost functions of the plurality of assets in the DERs system together representing a system cost function for the overall DERs system;

determining, using the local cost function, an operating point for the given asset, using the determined operating point for the given asset to manage operation of the given asset in the DERs system.

12. The method of innovation 11 wherein a central agent uses the cost function for each of the plurality of assets to manage distribution of energy of the DERs system, the central agent being at least one of the asset managers.

13. The method of innovation 11 wherein each cost function is customized to each asset.

14. The method of innovation 11 wherein the cost function of each asset includes at least a portion relating to opportunity cost.

15. The method of innovation 14 wherein the opportunity cost comprises tunable parameters that its asset manager can modify to improve profit of its asset.

16. The method of innovation 11 wherein the cost function of each asset includes at least a portion relating to response limitations of the asset relative to a function of the asset.

17. The method of innovation 16 further comprising:

providing commands to a given asset, using its given asset manager, to produce a given response with response data from the given asset; and measuring the response data, one or more response limitations of the given asset being calculated by its given asset manager using the measured response data.

18. The method of innovation 11 wherein the asset includes one or more of a load, storage device, and an energy generation device.

19. The method of innovation 11 wherein each asset has an asset efficiency at a given operating point, the cost function of each asset being inversely proportional to the asset efficiency at the given operating point.

20. The method of innovation 19 further comprising:
providing commands to a given asset, using its given asset manager, to produce a given response with response data from the given asset; and
measuring the response data,
measured response data by the asset manager being used to calculate efficiency as a function of multiple variables, the calculated efficiency used to create the local cost function of the given asset.

21. The method of innovation 11 wherein each asset has a power rating, the cost function of each asset being inversely proportional to its power rating.

22. The method of innovation 11 wherein a given cost function of a given asset includes expected future conditions relating to the given asset.

23. The method of innovation 11 further comprising:
receiving operating data from a given asset; and
the asset manager of the given asset using the operating data to determine given asset response time and/or given asset efficiency,
said producing a local cost function comprising using the given asset response time and/or the given asset efficiency to produce the local cost function of the given asset.

24. A computer program product for use on a computer system for distributing power from an aggregated distributed energy resources system ("DERs system") having a plurality of assets, the computer program product comprising a tangible, non-transient computer usable medium having computer readable program code thereon, the computer readable program code comprising:
program code for communicating with a plurality of asset managers to manage the assets, each asset including a local dedicated asset manager separate from the other asset managers, each asset manager having an interface;
program code for producing, for each asset, a local cost function using its local dedicated asset manager, each local dedicated asset manager producing its local cost function using data relating to its local asset only, the cost functions of the plurality of assets in the DERs system together representing a system grid cost function for the overall DERs system;
program code for determining, using the local cost function, an operating point for the given asset; and
program code for using the determined operating point for the given asset to manage operation of the given asset in the DERs system.

25. The computer program product of innovation 24 further comprising program code for to control a central agent to use the cost function for each of the plurality of assets to manage distribution of energy of the DERs system, the central agent being at least one of the asset managers.

26. The computer program product of innovation 24 wherein the cost function of each asset includes at least a portion relating to opportunity cost.

27. The computer program product of innovation 26 wherein the opportunity cost comprises tunable parameters that its asset manager can modify to improve profit of its asset.

28. The computer program product of innovation 24 wherein the cost function of each asset includes at least a portion relating to response limitations of the asset relative to a function of the asset.

29. The computer program product of innovation 24 further comprising:
program code for providing commands to a given asset, using its given asset manager, to produce a given response with response data from the given asset; and
program code for measuring the response data,
one or more response limitations of the given asset being calculated by its given asset manager using the measured response data.

30. The computer program product of innovation 24 wherein each asset has an asset efficiency at a given operating point, the cost function of each asset being inversely proportional to the asset efficiency at the given operating point.

31. The computer program product of innovation 30 further comprising:
program code for providing commands to a given asset, using its given asset manager, to produce a given response with response data from the given asset; and
program code for measuring the response data,
program code for controlling the asset manager to use measured response data to calculate efficiency as a function of multiple variables, the calculated efficiency used to create the local cost function of the given asset.

32. The computer program product of innovation 24 wherein each asset has a power rating, the cost function of each asset being inversely proportional to its power rating.

33. The computer program product of innovation 24 wherein a given cost function of a given asset includes expected future conditions relating to the given asset.

34. The computer program product of innovation 24 further comprising:
program code for receiving operating data from a given asset; and
program code for using the operating data to determine given asset response time and/or given asset efficiency,
said program code for producing comprising program code for using the given asset response time and/or the given asset efficiency to produce the local cost function of the given asset.

What is claimed is:

1. An asset manager configured to control distribution of power within an aggregated distributed energy resources system ("DERs system"), the DERs system having a plurality of assets and a system cost function, the asset manager being configured to operate with a given asset in the DERs system, each given asset having a local function as part of the system cost function, the asset manager comprising:
an interface configured to receive asset information relating to the given asset and to communicate with at least one other asset manager or a central controller in the DERs system;
a function generator operatively coupled with the interface, the function generator configured to produce a local cost function using data relating to the given asset, the local cost function representing a portion of a system cost function for the overall DERs system; and
a controller operatively coupled with the function generator, the controller configured to determine, using the local cost function, an operating point for the given asset,
the controller also being configured to use the determined operating point for the given asset to manage operation of the given asset in the DERs system.

2. The asset manager of claim 1 wherein the interface is configured to receive one or more cost functions from other asset managers, the controller configured to forward control signals to the other asset managers to manage distribution of energy of the DERs system as a function of the local cost function and the received one or more cost functions.

3. The asset manager of claim 1 wherein the local cost function includes at least a portion relating to opportunity cost.

4. The asset manager of claim 3 wherein the opportunity cost comprises tunable parameters that the controller is configured to modify to improve revenue of the given asset.

5. The asset manager of claim 1 wherein the local cost function includes at least a portion relating to response limitations of the given asset relative to a function of the given asset.

6. The asset manager of claim 1 further comprising:
the controller being configured, in response to receipt of commands to the given asset, to produce a given response with response data relating to the given asset, the controller being configured to measure the response data and calculate one or more response limitations of the given asset using the measured response data.

7. The asset manager of claim 1 wherein the given asset has an asset efficiency at a given operating point, the local cost function being inversely proportional to the asset efficiency at the given operating point.

8. The asset manager of claim 1 wherein the given asset has a power rating, the local cost function being inversely proportional to the power rating.

9. The asset manager of claim 1 wherein the local cost function includes expected future conditions at non-uniform time intervals relating to the given asset.

10. The asset manager of claim 1 wherein the controller is configured to receive operating data from the given asset, and then use the operating data to determine given asset response time and/or given asset efficiency,
the function generator using the given asset response time and/or the given asset efficiency to produce the local cost function of the given asset.

11. A method of distributing power from an aggregated distributed energy resources system ("DERs system") having a plurality of assets, the method comprising:
using a plurality of asset managers to manage the assets, each asset including a local dedicated asset manager separate from the other asset managers or a central controller, each asset manager having an interface to receive asset information relating to its asset;
for each asset, producing a local cost function using its local dedicated asset manager, each local dedicated asset manager producing its local cost function using data relating to its local asset, the cost functions of the plurality of assets in the DERs system together representing a system cost function for the overall DERs system;
determining, using the local cost function, an operating point for the given asset,
using the determined operating point for the given asset to manage operation of the given asset in the DERs system.

12. The method of claim 11 wherein a central agent uses the cost function for each of the plurality of assets to manage distribution of energy of the DERs system, the central agent being at least one of the asset managers.

13. The method of claim 11 wherein each asset has an asset efficiency at a given operating point, the cost function of each asset being inversely proportional to the asset efficiency at the given operating point.

14. The method of claim 11 wherein each asset has an asset efficiency at a given operating point, the cost function of each asset being inversely proportional to the asset efficiency at the given operating point,
further comprising:
providing commands to a given asset, using its given asset manager, to produce a given response with response data from the given asset; and
measuring the response data,
measured response data by the asset manager being used to calculate efficiency as a function of multiple variables, the calculated efficiency used to create the local cost function of the given asset.

15. The method of claim 11 wherein each asset has a power rating, the cost function of each asset being inversely proportional to its power rating.

16. The method of claim 11 wherein a given cost function of a given asset includes expected future conditions relating to the given asset.

17. The method of claim 11 further comprising:
receiving operating data from a given asset; and
the asset manager of the given asset using the operating data to determine given asset response time and/or given asset efficiency,
said producing a local cost function comprising using the given asset response time and/or the given asset efficiency to produce the local cost function of the given asset.

18. A computer program product for use on a computer system for distributing power from an aggregated distributed energy resources system ("DERs system") having a plurality of assets, the computer program product comprising a tangible, non-transient computer usable medium having computer readable program code thereon, the computer readable program code comprising:
program code for communicating with a plurality of asset managers to manage the assets, each asset including a local dedicated asset manager separate from the other asset managers, each asset manager having an interface;
program code for producing, for each asset, a local cost function using its local dedicated asset manager, each local dedicated asset manager producing its local cost function using data relating to its local asset, the cost functions of the plurality of assets in the DERs system together representing a system grid cost function for the overall DERs system;
program code for determining, using the local cost function, an operating point for the given asset; and
program code for using the determined operating point for the given asset to manage operation of the given asset in the DERs system.

19. The computer program product of claim 18 further comprising program code for to control a central agent to use the cost function for each of the plurality of assets to manage distribution of energy of the DERs system, the central agent being at least one of the asset managers.

20. The computer program product of claim 18 further comprising:
program code for receiving operating data from a given asset; and
program code for using the operating data to determine given asset response time and/or given asset efficiency, said program code for producing comprising program code for using the given asset response time and/or the given asset efficiency to produce the local cost function of the given asset.

* * * * *

UNITED STATES PATENT AND TRADEMARK OFFICE
CERTIFICATE OF CORRECTION

| | | |
|---|---|---|
| PATENT NO. | : 11,664,678 B2 | Page 1 of 1 |
| APPLICATION NO. | : 17/155382 | |
| DATED | : May 30, 2023 | |
| INVENTOR(S) | : Jorge Elizondo Martinez et al. | |

It is certified that error appears in the above-identified patent and that said Letters Patent is hereby corrected as shown below:

In the Claims

At Column 24, Claim number 19, Line number 58, please replace "to control" with --controlling--

Signed and Sealed this
Twenty-ninth Day of August, 2023

*Katherine Kelly Vidal*

Katherine Kelly Vidal
*Director of the United States Patent and Trademark Office*